United States Patent [19]
Eliovson

[11] Patent Number: 6,128,618
[45] Date of Patent: Oct. 3, 2000

[54] SYSTEM AND METHOD FOR ENFORCING INTEGRITY IN COMPONENT PLAN CONSTRUCTION

[76] Inventor: Moshe T. Eliovson, 96 Cedarwoods La., Fairfield, Conn. 06432

[21] Appl. No.: 08/969,221

[22] Filed: Nov. 13, 1997

[51] Int. Cl.[7] .................................................. G06R 17/00
[52] U.S. Cl. .......................... 707/101; 707/102; 707/201; 707/203
[58] Field of Search ........................... 707/1–206; 710/37

[56] References Cited

U.S. PATENT DOCUMENTS

| | | | |
|---|---|---|---|
| 5,805,889 | 9/1998 | Van De Vanter | 395/703 |
| 5,832,487 | 11/1998 | Olds et al. | 707/202 |
| 5,835,735 | 11/1998 | Mason et al. | 710/37 |
| 5,862,325 | 1/1999 | Reed et al. | 707/203 |
| 5,920,873 | 7/1999 | Van Huben et al. | 707/202 |

OTHER PUBLICATIONS

Finding The Right Strategic Combination, John Diffenbach, Journal of Business Strategy 1981, pp. 47–58.

*Primary Examiner*—Thomas G. Black
*Assistant Examiner*—David Yiuk Jung
*Attorney, Agent, or Firm*—Corbrin & Gittes

[57] ABSTRACT

A system and method which enforces integrity in the construction of component Plans, such Plans defined as being composed of one or more unique Strategies. The Strategies in turn are defined as being composed of one or more unique Objectives each and these Objectives in turn are defined as being composed of one or more unique Alternatives. The rules of uniqueness are enforced by the system and method which is designed to lead users intuitively through the construction of such Plans thus furthering the integrity of the Plans constructed through the system by virtue of the way the system organizes Plans and their components as its users proceed to utilize it The system offers a menu of activities associated with the tasks of constructing said Plans and their underlying components. The system stores Plans and their underlying components in a way that not only insures the Plans' overall integrity, but also the same integrity for Plans' underlying components as well, so that they may be recalled intact when desired. The system and method allows components to be combined in a "mix-and-match" fashion all the while enforcing its rules of integrity regarding such Plans to facilitate the creation of other Plans in a creative, rapid and error free fashion, errors being defined as duplication of components and mismatching components.

14 Claims, 35 Drawing Sheets

| Table Definition for *indexes* | | | |
|---|---|---|---|
| Fields | | | |
| Name | Type | Size | |
| type | text | 15 | |
| id | long | 4 | |
| | | | |
| Index | | | |
| Name | Fields | Unique | |
| i1 | type | yes | |

Figure 23

**Table Definition for *links***

| Fields | | |
|---|---|---|
| Name | Type | Size |
| ptype | text | 1 |
| pid | long | 4 |
| ctype | text | 1 |
| cid | long | 4 |
| order | integer | 2 |

| Index | | |
|---|---|---|
| Name | Fields | Unique |
| i1 | ptype+pid+ctype+cid+order | yes |

Figure 24

**Table Definition for *objects***

Fields

| Name | Type | Size |
|---|---|---|
| type | text | 1 |
| id | long | 4 |
| name | text | 255 |

Index

| Name | Fields | Unique |
|---|---|---|
| i1 | type+pid | yes |
| i2 | name+type | yes |

Figure 25

| Sample Values for the *indexes* Table | |
|---|---|
| Field | Sample Value |
| type | alternative |
| id | -214748359 |

| Sample Values for the *objects* Table | |
|---|---|
| Field | Sample Value |
| type | A |
| id | -214748360 |
| name | Strategy 2 Objective 1 Alternative 1 |

| Sample Values for the *links* Table | |
|---|---|
| Field | Sample Value |
| ptype | O |
| pid | -214748358 |
| ctype | A |
| cid | -214748360 |
| order | 0 |

Figure 26

|    | TYPE | ID | NAME | P1 | S1 | O1 | A1 |
|----|------|----|------|----|----|----|----|
| a) | P | 1 | Serve a meal | 2 | 1 | 1 | 1 |
| b) | S | 1 | Serve breakfast | 2 | 2 | 1 | 1 |
| c) | S | 2 | Serve lunch | 2 | 3 | 1 | 1 |
| d) | S | 3 | Serve dinner | 2 | 4 | 1 | 1 |
| e) | O | 1 | Egg dishes for breakfast | 2 | 4 | 2 | 1 |
| f) | O | 2 | Cereal | 2 | 4 | 3 | 1 |
| g) | O | 3 | Beverage | 2 | 4 | 4 | 1 |
| h) | A | 1 | Scrambled | 2 | 4 | 4 | 2 |
| i) | A | 2 | Fried | 2 | 4 | 4 | 3 |
| j) | A | 3 | Soft-boiled | 2 | 4 | 4 | 4 |
| k) | A | 4 | Corn flakes | 2 | 4 | 4 | 5 |
| l) | A | 5 | Oatmeal | 2 | 4 | 4 | 6 |
| m) | A | 6 | Coffee | 2 | 4 | 4 | 7 |
| n) | A | 7 | Tea | 2 | 4 | 4 | 8 |
| o) | O | 4 | Sandwich | 2 | 4 | 5 | 8 |
| p) | O | 5 | Egg dishes for lunch | 2 | 4 | 6 | 8 |
| q) | O | 6 | Soup for lunch | 2 | 4 | 7 | 8 |
| r) | A | 8 | Roast beef sandwich | 2 | 4 | 7 | 9 |
| s) | A | 9 | Ham sandwich | 2 | 4 | 7 | 10 |
| t) | A | 10 | Liverwurst sandwich | 2 | 4 | 7 | 11 |
| u) | A | 11 | Western omelette | 2 | 4 | 7 | 12 |
| v) | A | 12 | Cheese omelette | 2 | 4 | 7 | 13 |
| w) | A | 13 | Vegetable | 2 | 4 | 7 | 14 |
| x) | A | 14 | Tomato | 2 | 4 | 7 | 15 |
| y) | O | 7 | Soup for dinner | 2 | 4 | 8 | 15 |
| z) | O | 8 | Entree | 2 | 4 | 9 | 15 |
| aa) | O | 9 | Vegetable | 2 | 4 | 10 | 15 |
| ab) | A | 15 | Cream of asparagus | 2 | 4 | 10 | 16 |
| ac) | A | 16 | Clam chowder | 2 | 4 | 10 | 17 |
| ad) | A | 17 | Steak | 2 | 4 | 10 | 18 |
| ae) | A | 18 | Roast beef | 2 | 4 | 10 | 19 |
| af) | A | 19 | Pork chops | 2 | 4 | 10 | 20 |
| ag) | A | 20 | Ham | 2 | 4 | 10 | 21 |
| ah) | A | 21 | Peas | 2 | 4 | 10 | 22 |
| ai) | A | 22 | Carrots | 2 | 4 | 10 | 23 |

Figure 28a          Figure 28b

|      | PTYPE | PID | CTYPE | CID | ORDER |
|------|-------|-----|-------|-----|-------|
| a)   | P | 1 | S | 1  | 0 |
| b)   | P | 1 | S | 2  | 1 |
| c)   | P | 1 | S | 3  | 2 |
| d)   | S | 1 | O | 1  | 0 |
| e)   | S | 1 | O | 2  | 1 |
| f)   | S | 1 | O | 3  | 2 |
| g)   | O | 1 | A | 1  | 0 |
| h)   | O | 1 | A | 2  | 1 |
| i)   | O | 1 | A | 3  | 2 |
| j)   | O | 2 | A | 4  | 0 |
| k)   | O | 2 | A | 5  | 1 |
| l)   | O | 3 | A | 6  | 0 |
| m)   | O | 3 | A | 7  | 1 |
| n)   | S | 2 | O | 4  | 0 |
| o)   | S | 2 | O | 5  | 1 |
| p)   | S | 2 | O | 6  | 2 |
| q)   | S | 2 | O | 3  | 3 |
| r)   | O | 4 | A | 8  | 0 |
| s)   | O | 4 | A | 9  | 1 |
| t)   | O | 4 | A | 10 | 2 |
| u)   | O | 5 | A | 11 | 0 |
| v)   | O | 5 | A | 12 | 1 |
| w)   | O | 6 | A | 13 | 0 |
| x)   | O | 6 | A | 14 | 1 |
| y)   | S | 3 | O | 7  | 0 |
| z)   | S | 3 | O | 8  | 1 |
| aa)  | S | 3 | O | 9  | 2 |
| ab)  | S | 3 | O | 3  | 3 |
| ac)  | O | 7 | A | 13 | 0 |
| ad)  | O | 7 | A | 15 | 1 |
| ae)  | O | 7 | A | 16 | 2 |
| af)  | O | 8 | A | 17 | 0 |
| ag)  | O | 8 | A | 18 | 1 |
| ah)  | O | 8 | A | 19 | 2 |
| ai)  | O | 8 | A | 20 | 3 |
| aj)  | O | 9 | A | 21 | 0 |
| ak)  | O | 9 | A | 22 | 1 |

Figure 29

SYSTEM AND METHOD FOR ENFORCING INTEGRITY IN COMPONENT PLAN CONSTRUCTION

FIELD OF THE INVENTION

This invention relates to computer-implemented planning systems and methods, and more particularly, to a system and method of enforcing integrity in component Plans which require uniqueness.

BACKGROUND OF INVENTION

Oftentimes people are faced with many things to do and many ways to go about doing them. In an effort to organize the set of choices various systems, methods and models have been created to facilitate the organization and evaluation of the set of choices. An example is the famous GANTT chart, which illustrates the progress and layout of a Plan and its underlying tasks against a calendar together with a system of symbols which indicates hierarchy, priority, milestones, etc.

But GANTT chart systems and other systems and methods do not set limits. For example, there is nothing to stop a user from utilizing the same set of choices twice or even more times. When using such systems it is also common today to find the capability of combining sets of choices together and here too there is nothing to prevent duplication of the elements.

Another example is the organization limitation. Choices are not labeled as to their function/purpose and mixed elements can be combined when they should not be due to their different functions/purposes. The lack of clear delineation and structure with regard to the elements can compromise the overall integrity of the solution set(s).

There is therefore a need for a system and method which will enforce uniqueness in Plan elements for those occasions where uniqueness is required and which enforces overall integrity by providing facilities to clearly delineate the elements involved within their respective categories.

SUMMARY OF THE INVENTION

It is an object of the present invention to provide a method and system for enforcing uniqueness in component Plans, such Plans defined as being composed of one or more unique Strategies. The Strategies in turn are defined as being composed of one or more unique Objectives each and these Objectives in turn are defined as being composed of one or more unique Alternatives.

It is another object of the present invention to provide a method and system to clearly delineate the elements and overall structure of the said component Plans and the components that comprise said Plans.

It is another object of the present invention to provide a method and system for combining components from the same or different component Plans in such a way that enforces uniqueness so that the resulting Plan's components generated from said combinations meet the uniqueness criteria as well.

These and other objects, which will become apparent as the invention is more fully described below, are obtained by a system and method which enforces uniqueness and which is designed to lead users intuitively through the construction of such Plans thus furthering the integrity of the Plans constructed through the system by virtue of the way the system organizes Plans and their Components as its users proceed to utilize it. The system offers a menu of activities associated with the tasks of constructing said Plans and their underlying components. The system stores Plans and their underlying components in a way that not only insures the Plans' overall integrity, but also the same integrity for Plans' underlying components as well, so that they may be recalled intact when desired. The system and method allows components to be combined in a "mix-and-match" fashion all the while enforcing its rules of integrity regarding such Plans to facilitate the creation of other Plans in a creative, rapid and error free fashion, errors being defined as duplication of components and mismatching components.

BRIEF DESCRIPTION OF THE DRAWINGS

FIG. 23 is the definition of the relational database table of components' index id numbers.

FIG. 24 is the definition of the relational database table of Plans' components' links.

FIG. 25 is the definition of the relational database table of Plans' components' objects.

FIG. 26 is an illustration of sample data values for the Indexes, Objects and Links relational database tables.

FIG. 27a to FIG. 29 illustrate various effects of correction handling.

DESCRIPTION OF THE INVENTION AND ITS PREFERRED EMBODIMENT

Figure 1:
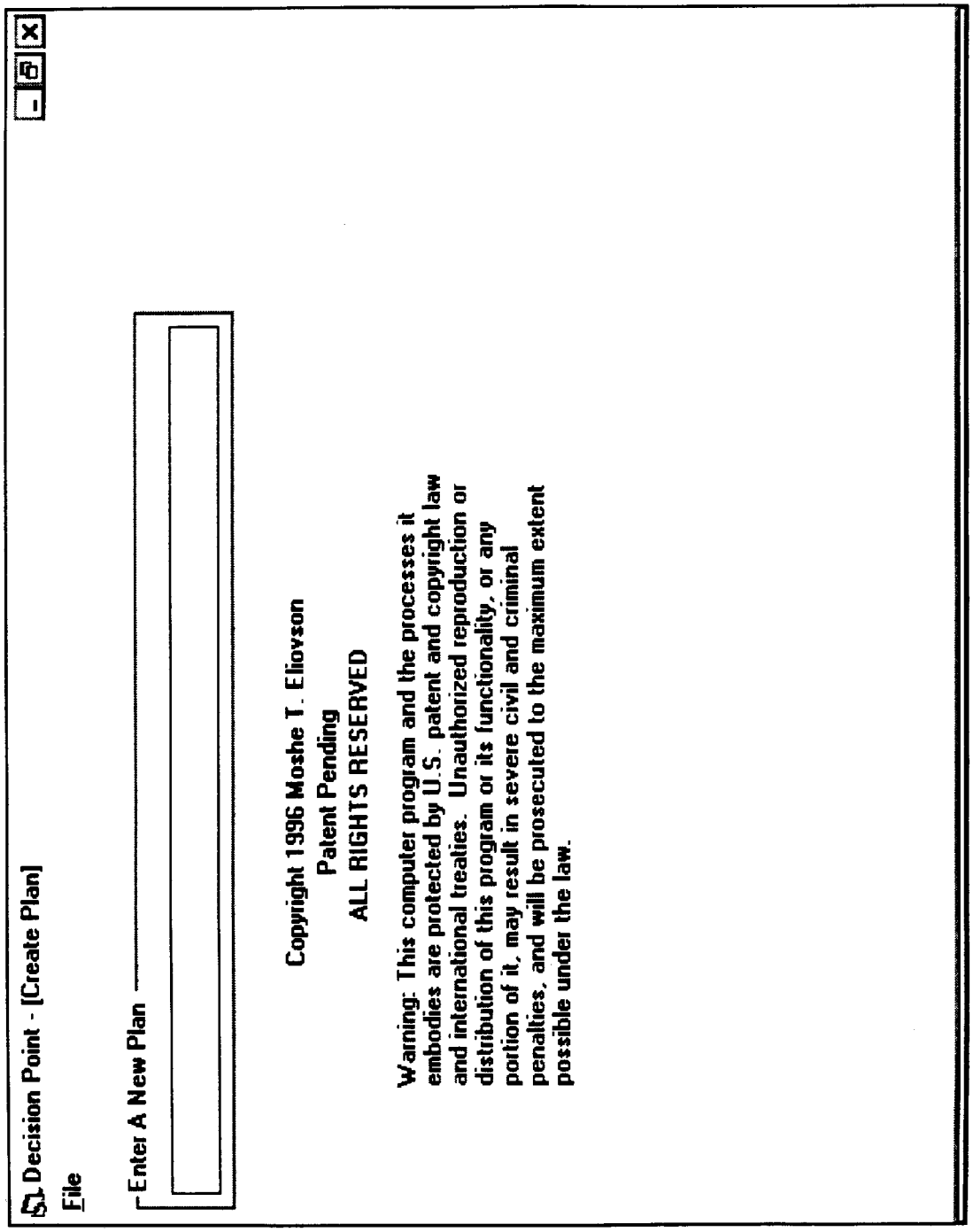
FIG. 1 is a display of the preferred embodiment of the initial screen a user sees which prompts the user for the first component of component Plans, namely the Plan name itself.

Creating a Plan begins with choosing a name for the Plan. FIG. 1 shows the preferred embodiment of the method where users are prompted to enter the name of a Plan. The users type the name in the rectangle which in the preferred embodiment is the text box located within the frame which clearly labels the text to be entered as a Plan while providing instruction to the users on how to proceed. (Text box and frame are Graphic User Interface (GUI) building blocks well known to persons of the same general level of programming skill. For the purpose of making this an enabling disclosure the description will employ these and other terms throughout its text.) All the elements of FIG. 1 are contained within a window which itself is a child window of the system's window.

The system's window in the preferred embodiment is a container window. All other windows which will be discussed are created within the system's container window, i.e., they cannot be separated from it.

Figure 2:
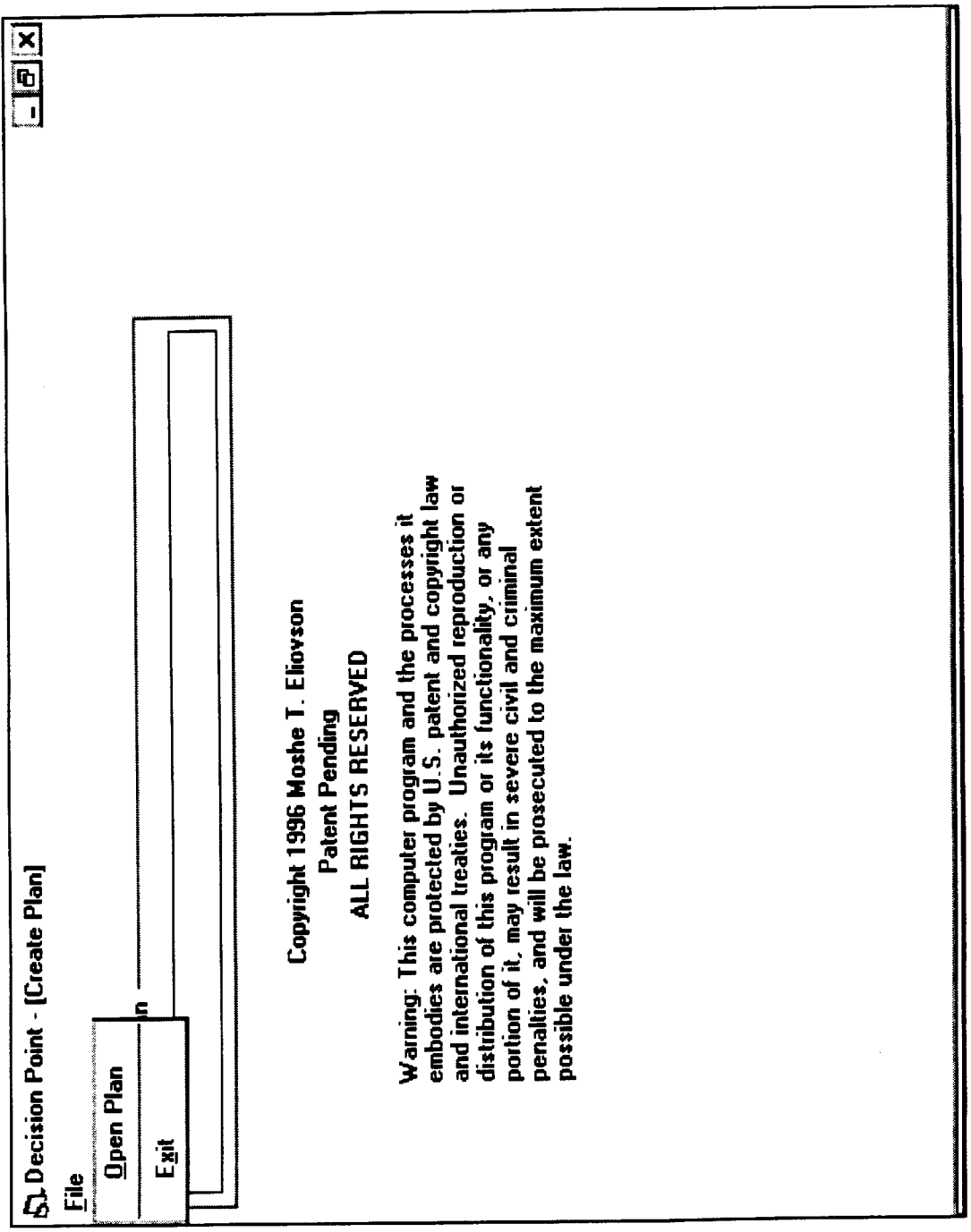
FIG. 2 is a display of the preferred embodiment of the initial menu a user sees. It offers two choices: exit the system or open a pre-saved Plan.
Figure 3:
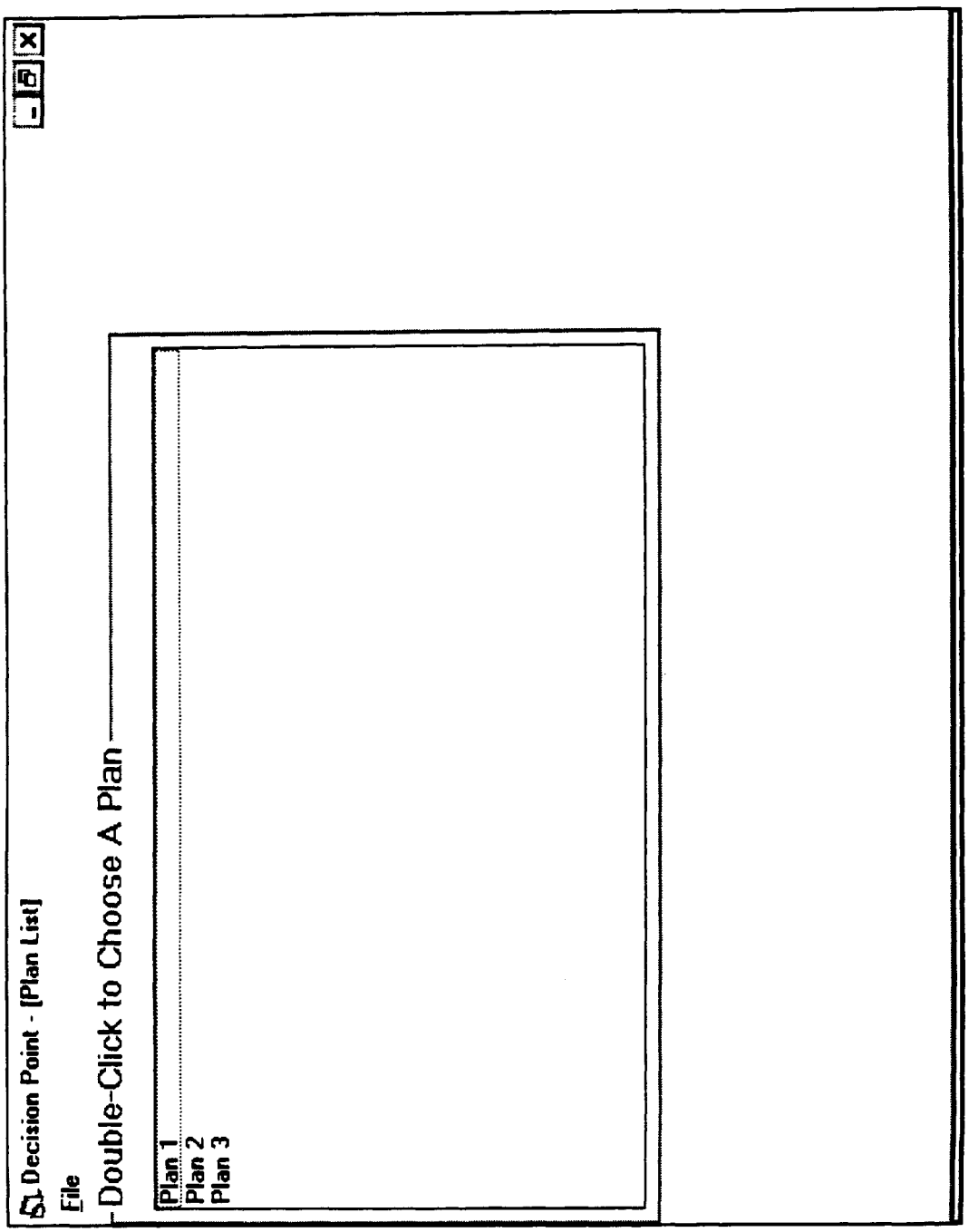
FIG. 3 is a display of the preferred embodiment of the pre-saved Plan selection method, which is accessed when the user chooses Open Plan from the menu in FIG. 2. It is a list of all pre-saved Plans framed by instructions to double-click with a pointing device such as a mouse to select and open the Plan desired.

FIG. 2 shows the preferred embodiment of the commands provided by the method associated with entering a Plan name. Users may choose to exit the system or Open a Plan previously defined and saved by the System. If users select the Open Plan command they are provided with a list of the previously defined and saved Plans by the system (FIG. 3). In the preferred embodiment this list is placed in a separate window. A Frame surrounds the list and instructs the users on how to select their desired Plan A File menu allows them to exit from the Plan selection window without making a selection. Doing so will close the window and return users to the window they were previously using, in this case the Window in FIG. 1. In the preferred embodiment all previously defined and saved components are saved in a database.

The system thus implicitly focuses users on the first step of the method of defining a unique Plan, by restricting them to either naming a Plan or choosing a Plan to work on.

Figure 3B:
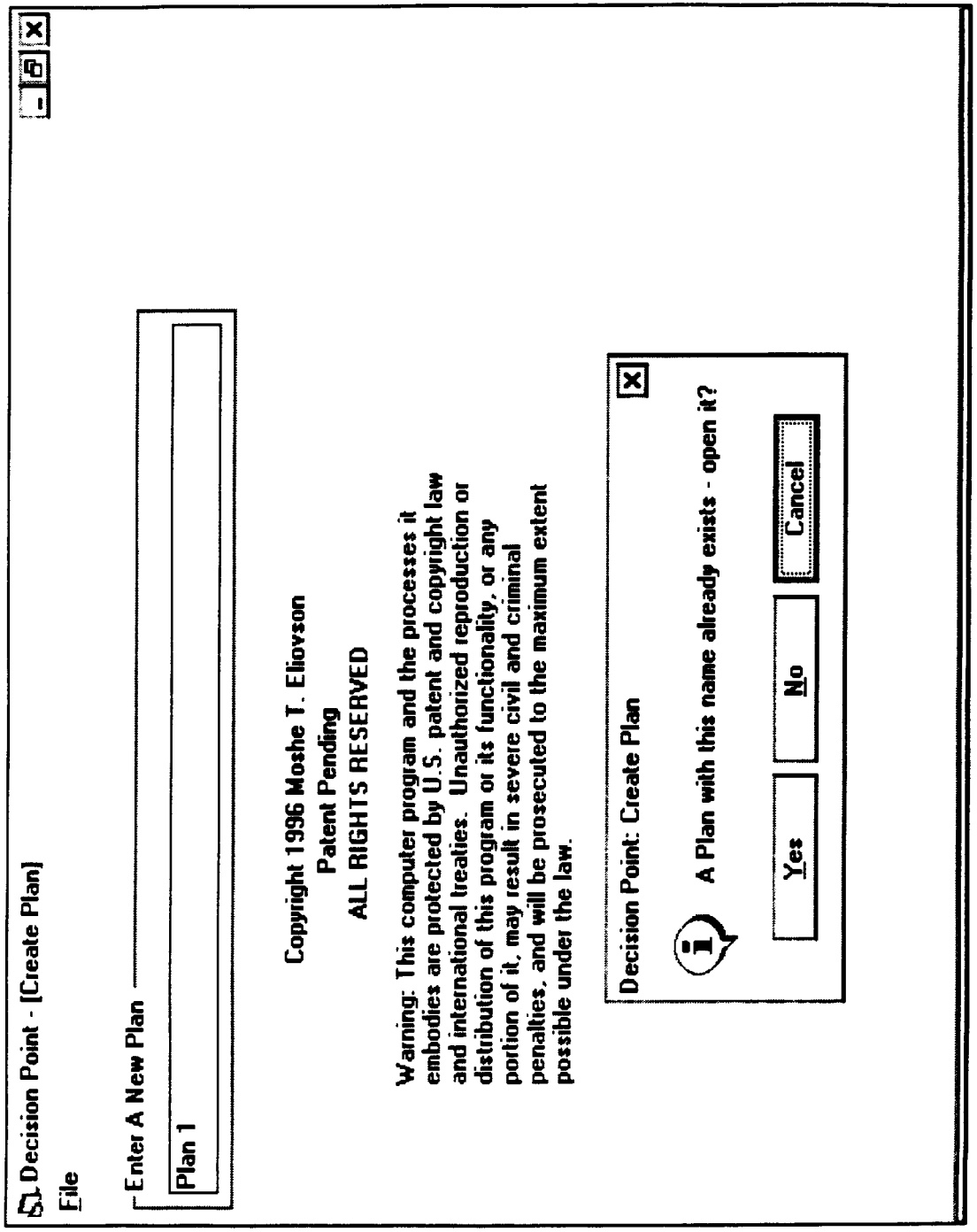
FIG. 3B is a display of the preferred embodiment of how the system would inform users when they had entered a Plan which was not "new" but rather had been defined previously.
Figure 3C:
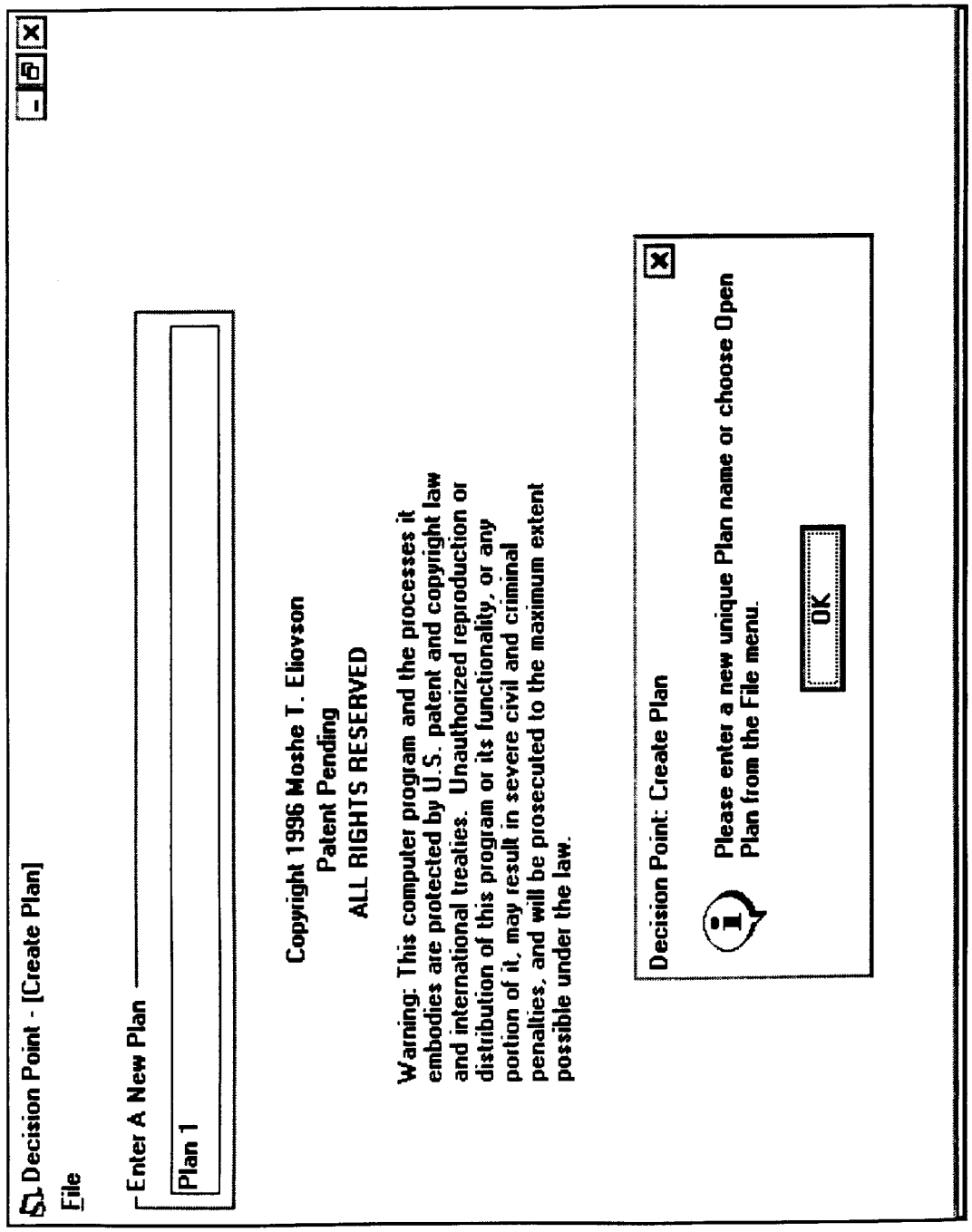
FIG. 3C is a display of the preferred embodiment of how the system would inform users of the uniqueness requirement when after they had entered a Plan name which had been previously defined and saved and chosen not to use the earlier definition. Since the system enforces uniqueness it tells users that they must change the Plan name since the name has already been taken.

FIG. 3B shows the preferred embodiment of the system for when users may enter a Plan name which is not new. Since the system enforces unique Plan names it will inform users if they have chosen a name which has been previously defined and saved and offer them the choice of Opening the previously defined Plan of the same name (FIG. 3B) or of entering a new, unique Plan name (FIG. 3C). If users respond affirmatively the system will open the previously defined Plan as will be described at the end of this description.

The method does this as follows. When a Plan name is entered it looks at all the previously defined and saved Plan names. In the preferred embodiment these and other objects are stored in a database. If the system finds a saved Plan with the same name it will report back to users as we saw in FIG.

3B. If the name proves to be new, i.e., it is not found among the previously defined and saved Plan names, the method will assign the Plan name a unique index id number and immediately save the now defined Plan name together with its unique index id number. In the preferred embodiment a database table for indexes is employed. The table has two columns: id and type (FIG. 23). On the top of FIG. 26 you can see an example of the values placed in these two columns. For Plan names, the system would look up the current id number associated with the "Plan" type. It would assign this id number as the index id number for the current Plan name and increment the id in the Indexes table to the next higher number. For example let's say the id number for the Plan "type" was 1 and we entered a Plan name called "Example". "Example" would be assigned index id number 1 and saved into the Objects table (FIG. 25) with type "P", id 1, name "Example". The middle section of FIG. 26 illustrates the assignments for an Object type of "A". Afterwards the id value in the Indexes table row for type "Plan" would be updated to 2. This methodology is well know to relational database programmers of average skill. This procedure is followed for the system's other Object types at the time that they are entered as well the only difference being the substitution of their appropriate types.

Looking up and assigning id numbers to Plans' various components as the system goes along rather than at the end of the process is a key step in how the system enforces Plans' data integrity.

If users choose to Open a previously defined and saved Plan, the system will do so. To understand what this means this description will first describe the step by step process of how it creates Plans and conclude with this point.

Figure 4:
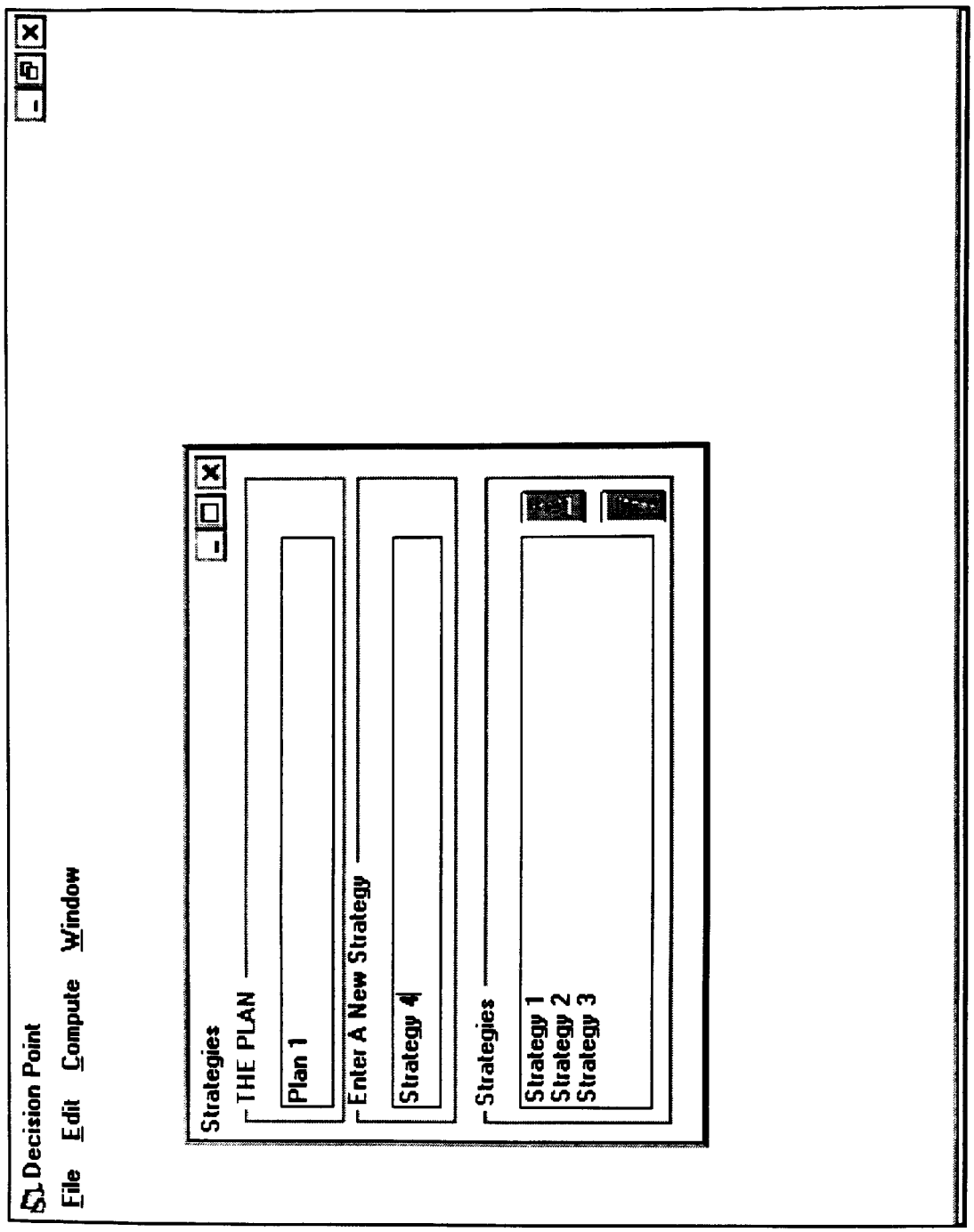
FIG. 4 is a display of the preferred embodiment of the Plan composition interface which includes the name of the Plan, an input area to enter Strategies and a labeled list of Strategies which make up the Plan. A menu of commands is available for the user to perform actions and in this the preferred embodiment it is located at the top of the display. All Components are labeled and the window encapsulating the data is labeled as well.

After a user enters a Plan name they can begin to define Strategies under this Plan. In the preferred embodiment the initial window is closed and a "Strategies" window is opened in which the Plan name is presented together with a text box to enter into the system Strategy names for the said Plan. The Plan name is clearly labeled as "THE PLAN" by a frame. The text box to enter in new Strategies is clearly labeled with instructions by a frame which reads "Enter A New Strategy". A listbox labeled by a frame which reads "Strategies" lists whatever Strategies have been defined for the Plan. In FIG. 4 you can see that three Strategies for the Plan named "Plan 1" have already been entered and appear in the listbox of Strategies and a user is currently entering a fourth Strategy.

Figure 5:
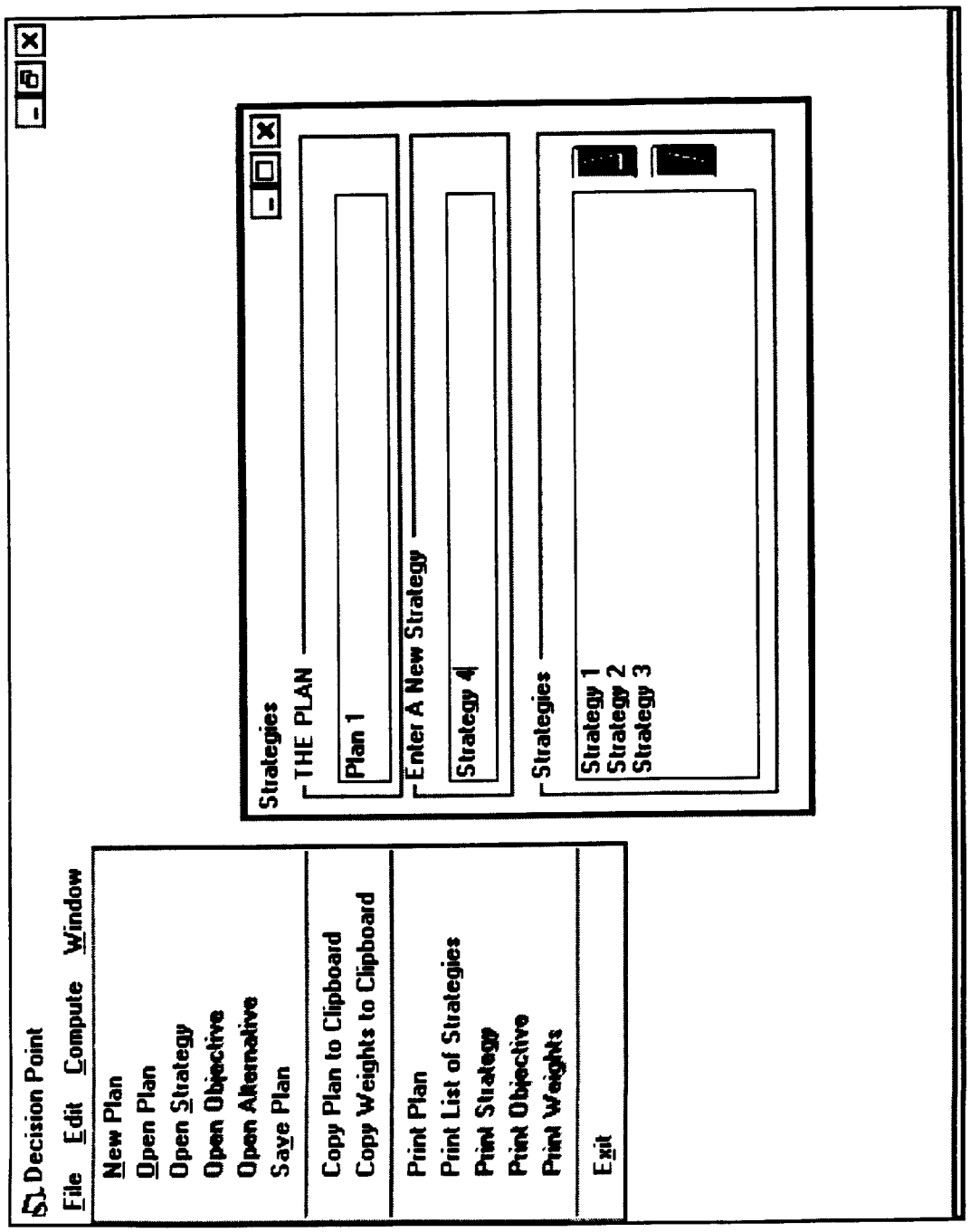
FIG. 5 is a display of the preferred embodiment of the menu of File commands associated with the Plan composition interface.
Figure 6:
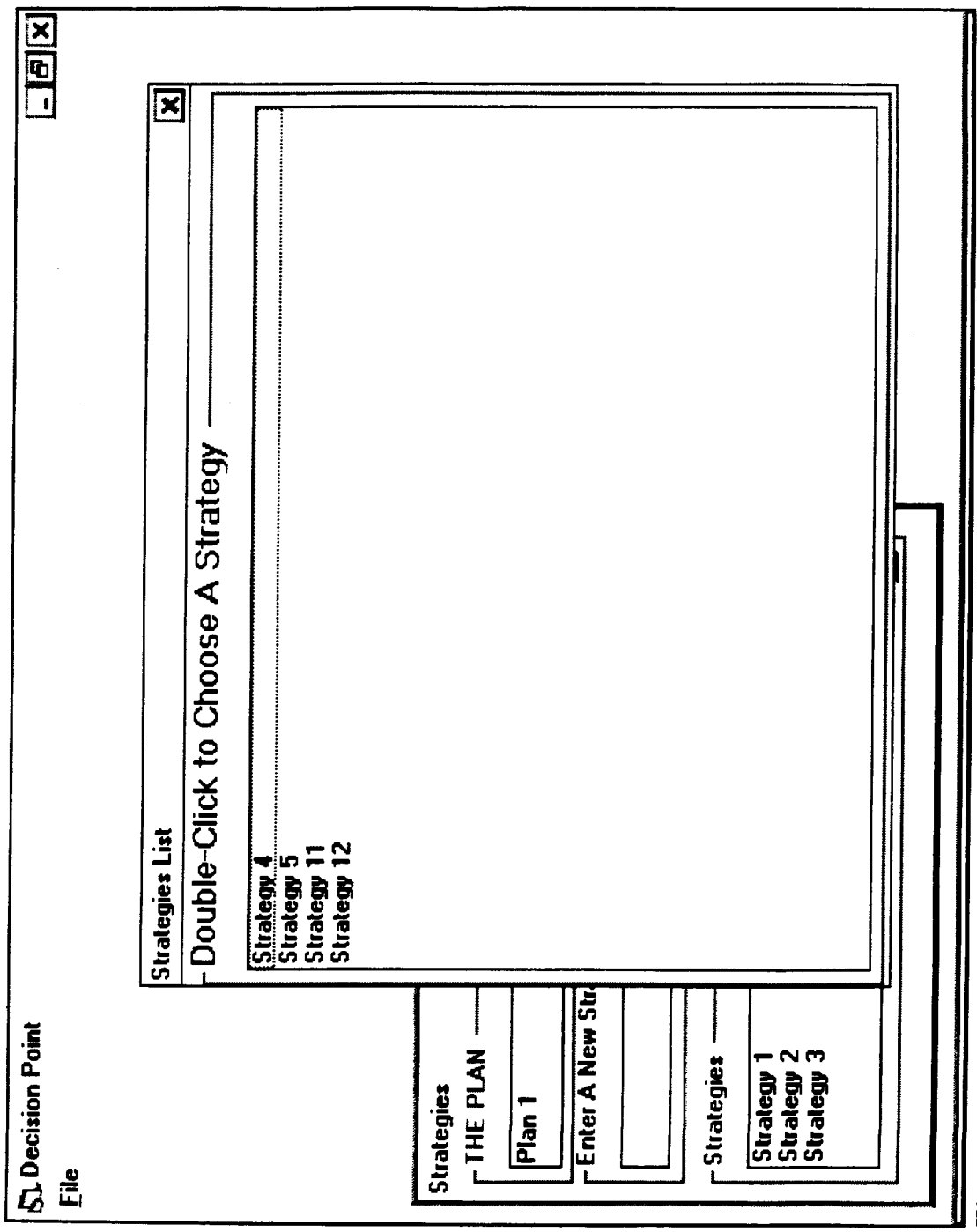
FIG. 6 is a display of the preferred embodiment of the pre-saved Strategy selection method, which is accessed when the user chooses Open Strategy from the menu. It is a list of all pre-saved strategies except those in the current Plan framed by instructions to double click with a pointing device such as a mouse to select and open the Strategy desired.

As with Plans, users may choose to open a previously saved and defined Strategy as part of the Plan. In the preferred embodiment this is a choice under the File menu (FIG. 5). If they do so they are presented with a list of previously defined and saved Strategies from which to choose. In the preferred embodiment the list appears in its own window within a listbox. The listbox is surrounded by a frame which provides instructions on how to select a Strategy. The window is clearly labeled "Strategies List" and a File menu allows users to exit without making a selection (FIG. 6). Note that even though Strategies 1–3 have been defined as can be seen in the lower left hand corner of FIG. 6, these Strategies do not appear in the Strategies List shown in FIG. 6. This is an implicit function of the system. When the system retrieves the list of previously defined and saved Strategies from the Objects relational database table it checks to make sure that each Strategy it retrieves isn't already in the Plan in question. If a Strategy is in the Plan already, the system omits that Strategy from the list enforcing the uniqueness methodology by removing the very possibility of making a duplicate selection of a Strategy already in the Plan's list of Strategies.

Figure 7:
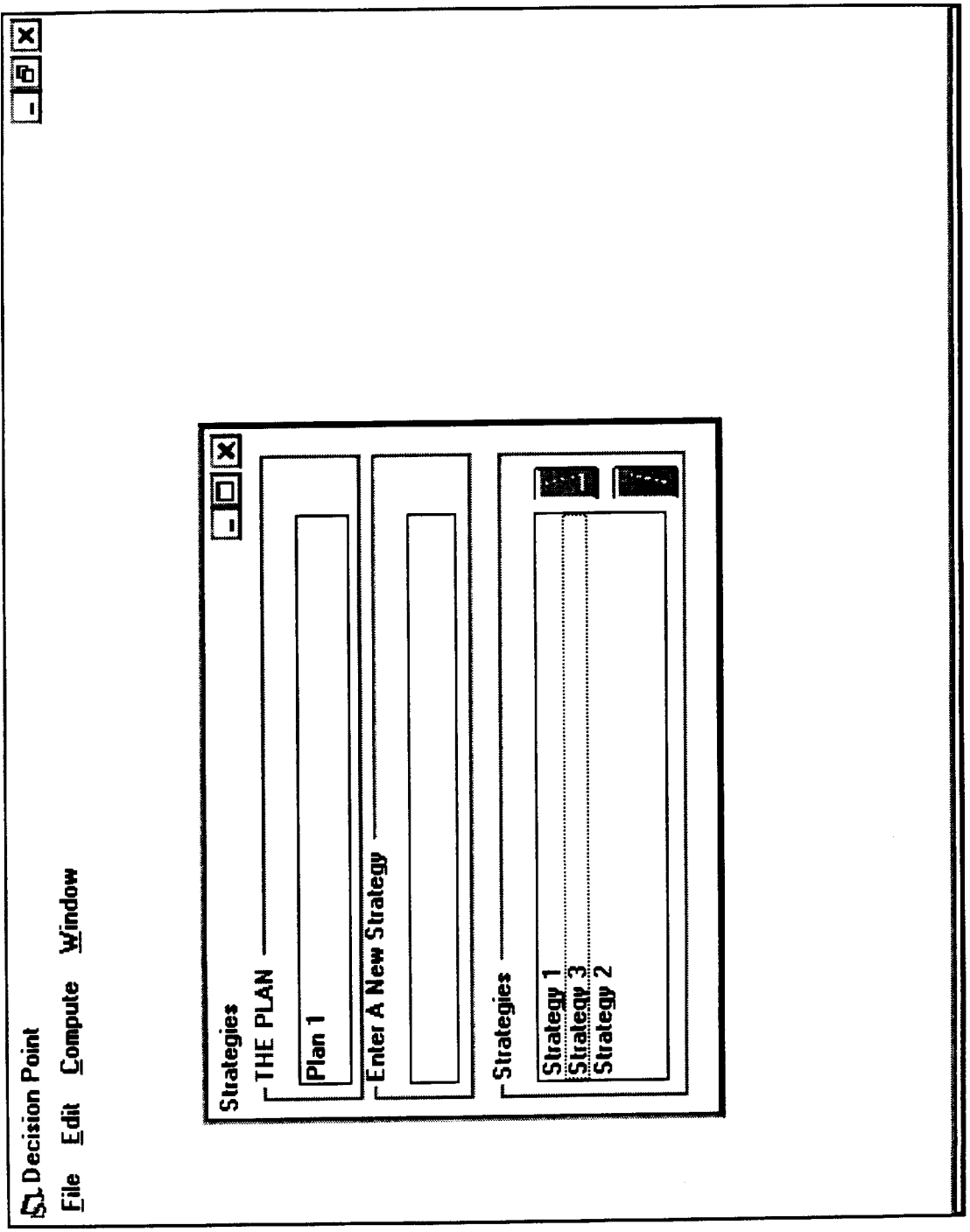
FIG. 7 is a display of the preferred embodiment of the Plan composition interface when the arrow buttons associated with the Plan's Strategies are employed to rearrange the order of a Plan's Strategies.
Figure 8:
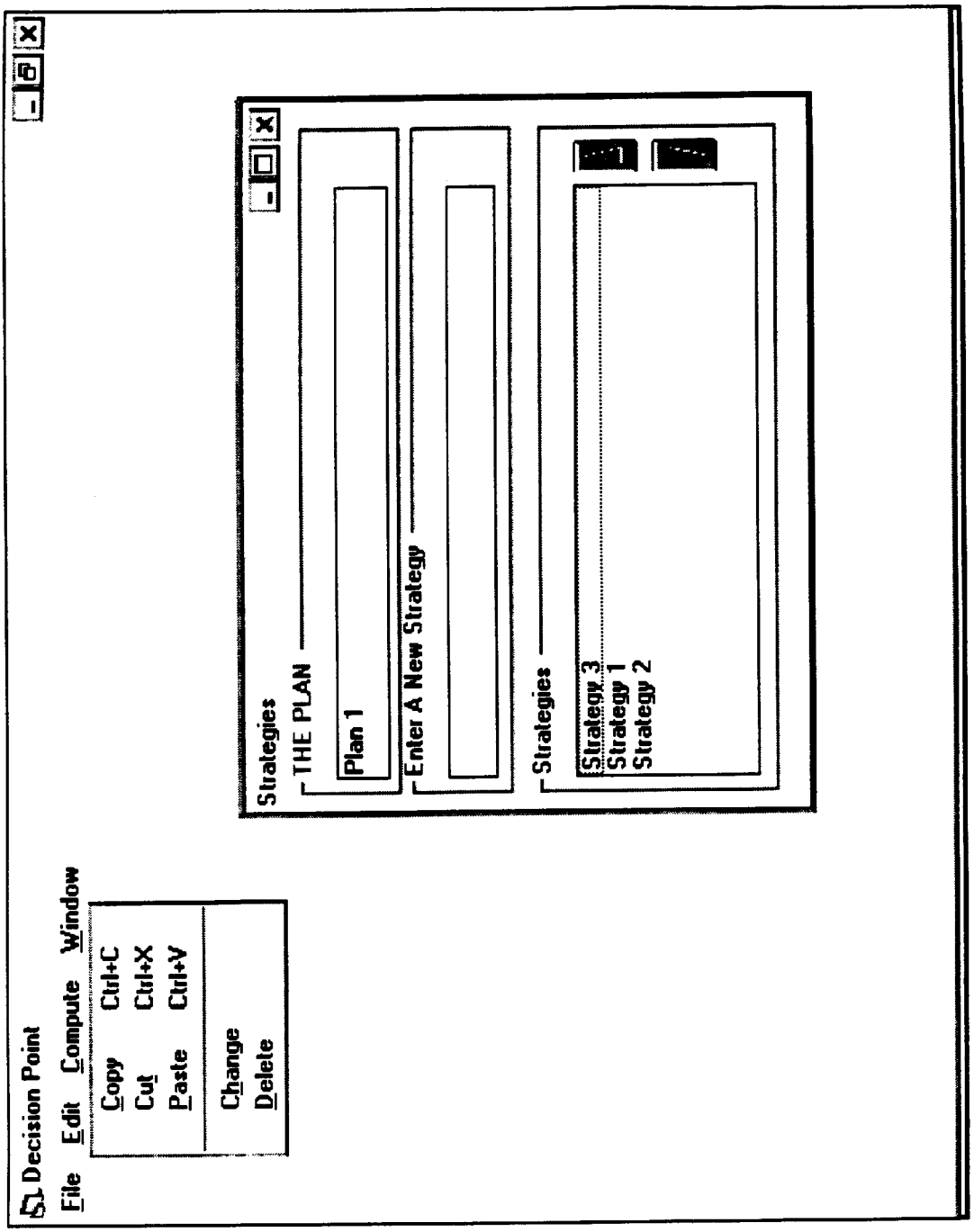
FIG. 8 is a display of the preferred embodiment of the Plan composition interface's Edit menu.

FIGS. 7 and 8 illustrate how the system facilitates Plan organization by allowing users to reorganize Plans' Strategies' order. In the preferred embodiment shown in FIGS. 7 and 8 two buttons with "up" and "down" arrow symbols are placed next to the Strategies listbox. When users select a Strategy in the listbox and then click on one of these arrow buttons the system will shift the Strategy up or down in the list, changing the order of a Plan's Strategies.

FIG. 8 also shows the preferred embodiment of two commands associated with the process' method of defining Plan's Strategies. Under an Edit menu users may either select "Change" or "Delete". "Delete" will remove the Strategy selected from the Plan's Strategies list. If the Strategy which is being deleted has its underlying components already defined is will be seen further in the description) these components will also be removed from the Plan "Change" will allows users to change the name of the selected Strategy. In the preferred embodiment the Edit menu with the "Change" and "Delete" commands appears for Strategies, Objectives and Alternatives, while changing the Plan name while its definition is in course is done simply by editing the name of the Plan in the Strategies window (FIG. 8).

Figure 8B:
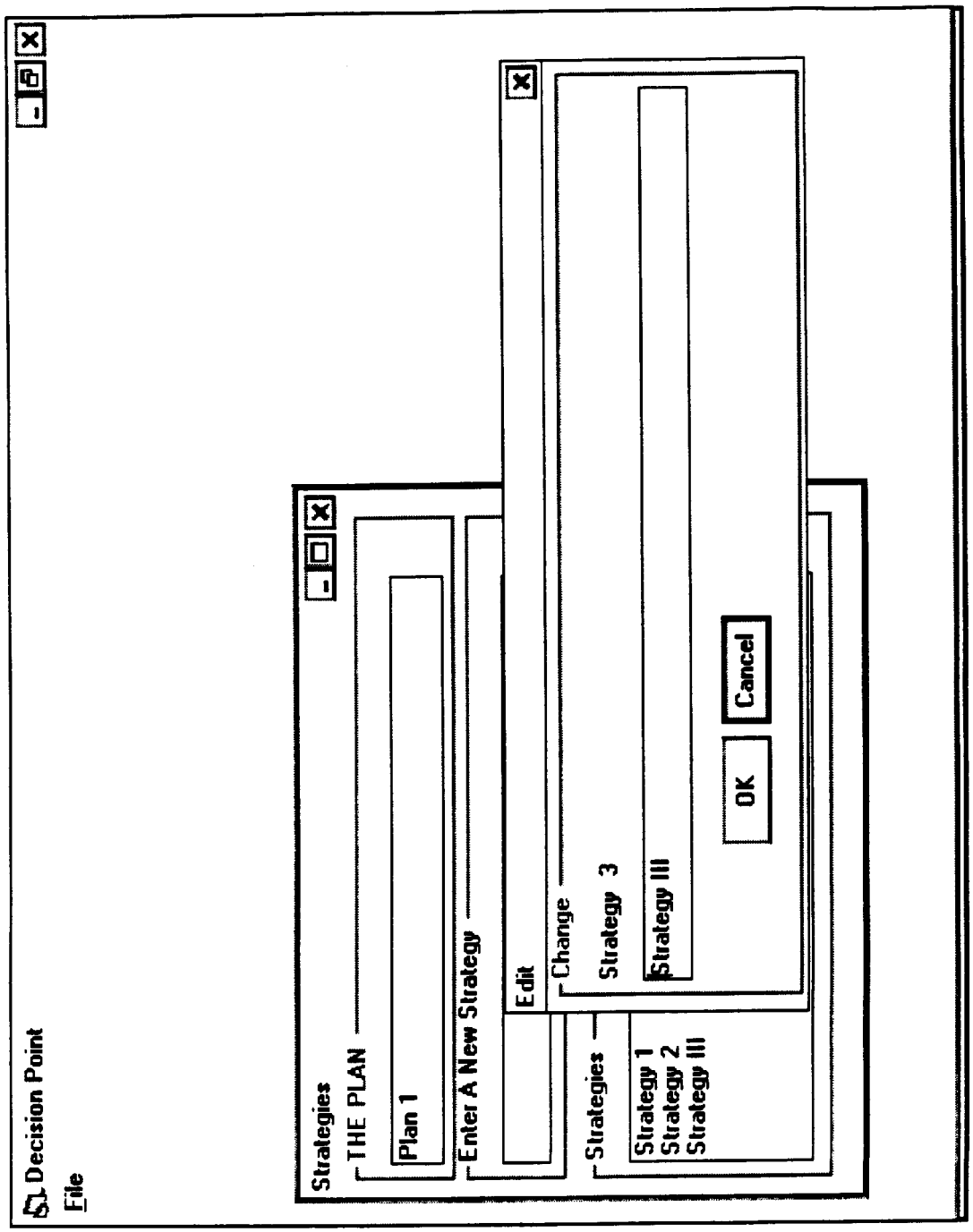
FIG. 8B is a display of the preferred embodiment of the Edit menu's Change command interface when employed to change a Strategy name.
Figure 8C:
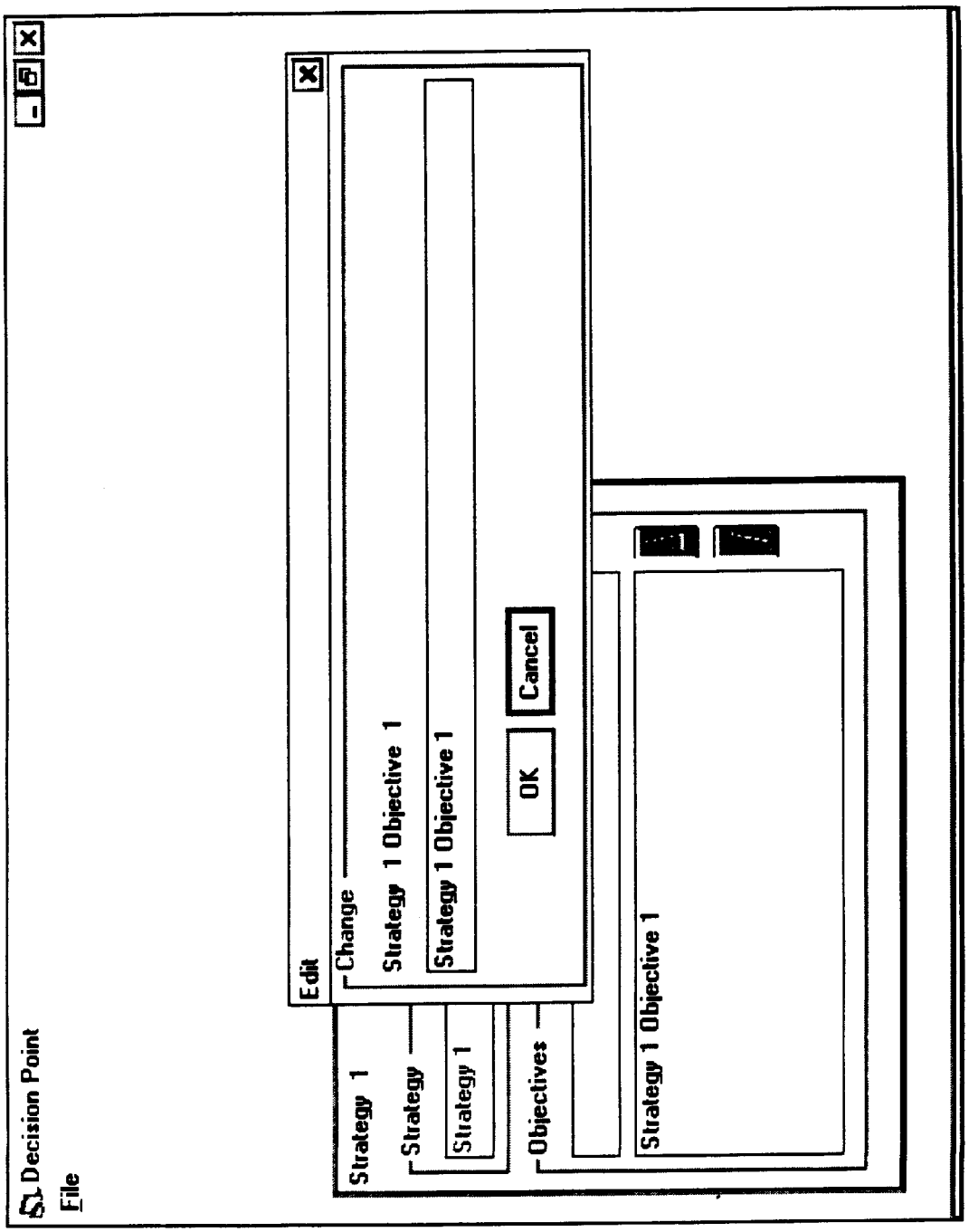
FIG. 8C is a display of the preferred embodiment of the Edit menu's Change command interface when employed to change an Objective name.
Figure 8D:
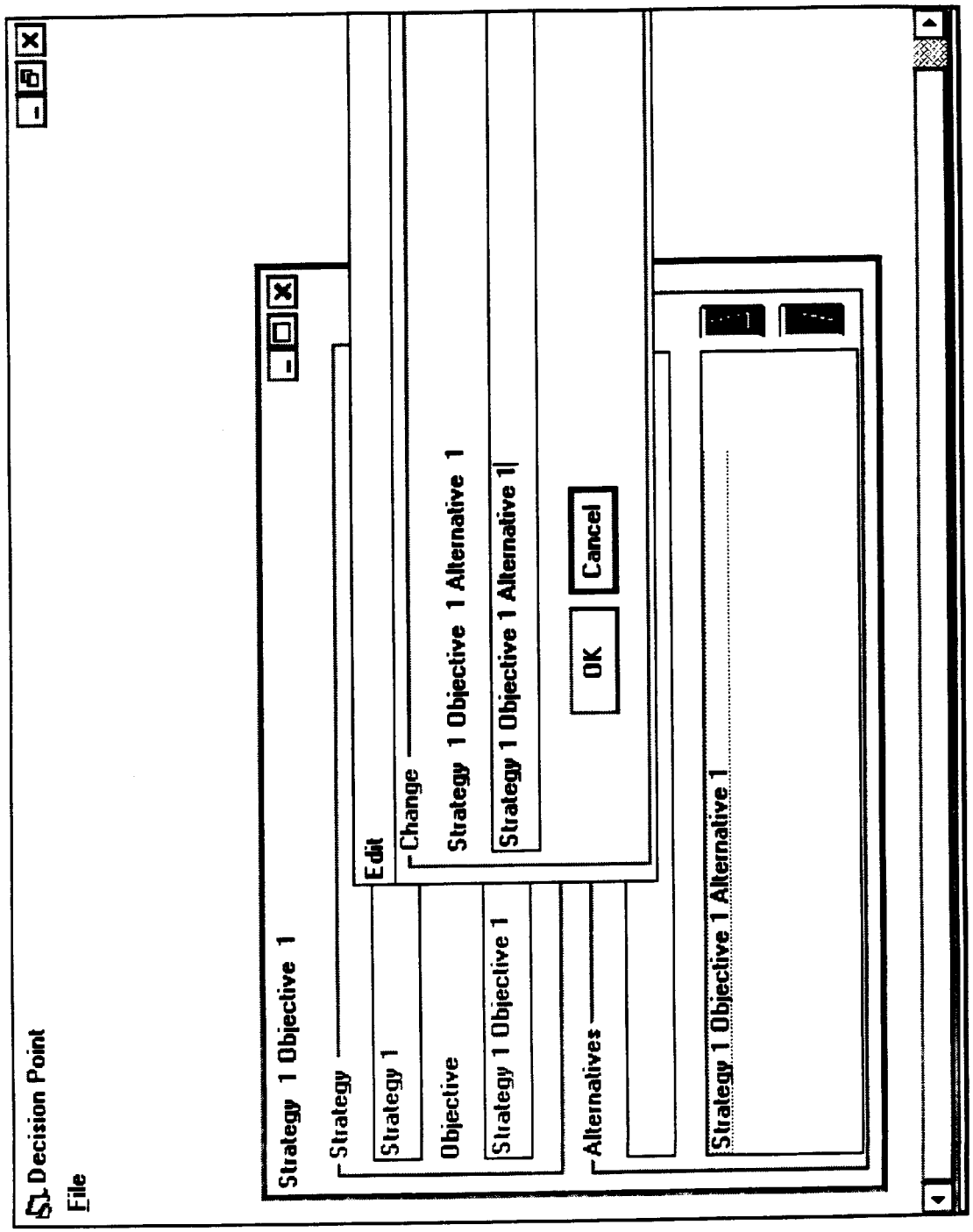
FIG. 8D is a display of the preferred embodiment of the Edit menu's Change command interface when employed to change an Alternative name.

FIGS. 8B, 8C and 8D show the preferred embodiment of the Edit menu's Change command interface as employed for Strategies, Objectives and Alternatives respectively. In the preferred embodiment the interface is in a separate window labeled "Edit". The window contains a frame labeled "Change" which contains a label, a textbox and two command buttons: OK and Cancel. The Cancel button is the default, meaning, that if the user presses the enter key or presses the ESC button on the keyboard the Cancel button's programming takes effect. The label as can be seen in the figures is filled in with a description of what is being edited for change. The textbox contains the Strategy, Objective or Alternative name being edited and editing takes place within this textbox. If users press Cancel with a pointing device, or press Enter or press the ESC button this interface closes and the name remains unchanged. If users press OK with a pointing device one of two things happen. If the name has not been changed the behavior is the same as the Cancel button's behavior. If the name has been changed users are prompted via a messagebox to confirm that they would like to effect the change(s) they entered. If the answer to the prompt is "Yes" then the system proceeds to change the name in question throughout the system, meaning its stored definition as well as in any open window in which the name appears. This is another means by which the system and method enforces integrity, i.e., by insuring that changes are propagated 100%. Selecting an item in the preferred embodiment means clicking on the desired item within a listbox with the pointing device which will highlight the item in question. Alternative selection methods include using the keyboard arrow keys to move the "selection highlight bar" up or down the list to the item desired.

Figure 9:
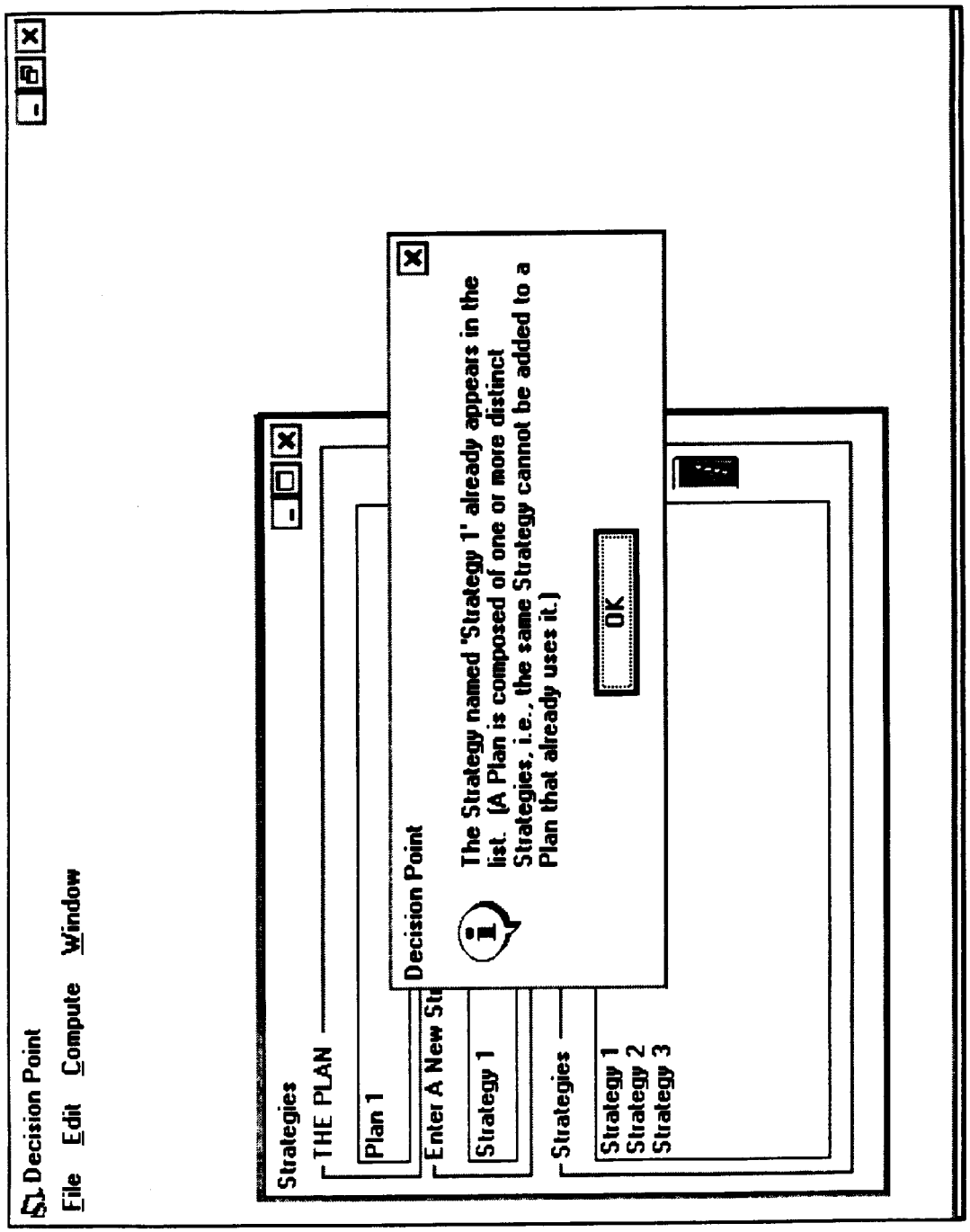
FIG. 9 is a display of the preferred embodiment of how the system would inform users when they had tried to enter the same Strategy more than once into a Plan.
Figure 10:
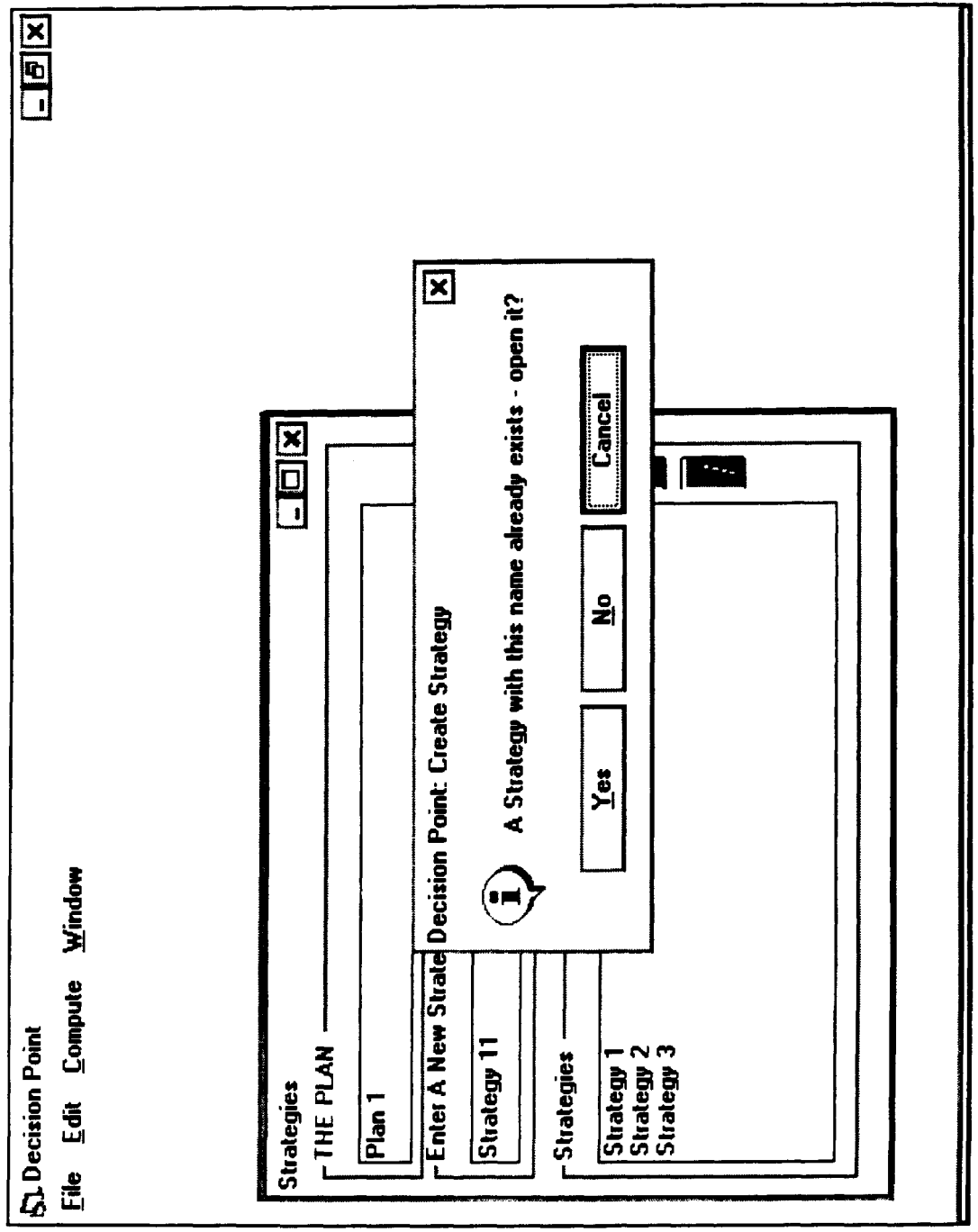
FIG. 10 is a display of the preferred embodiment of how the system would inform users when they had entered a Strategy which was not "new" but rather had been defined previously.
Figure 11:
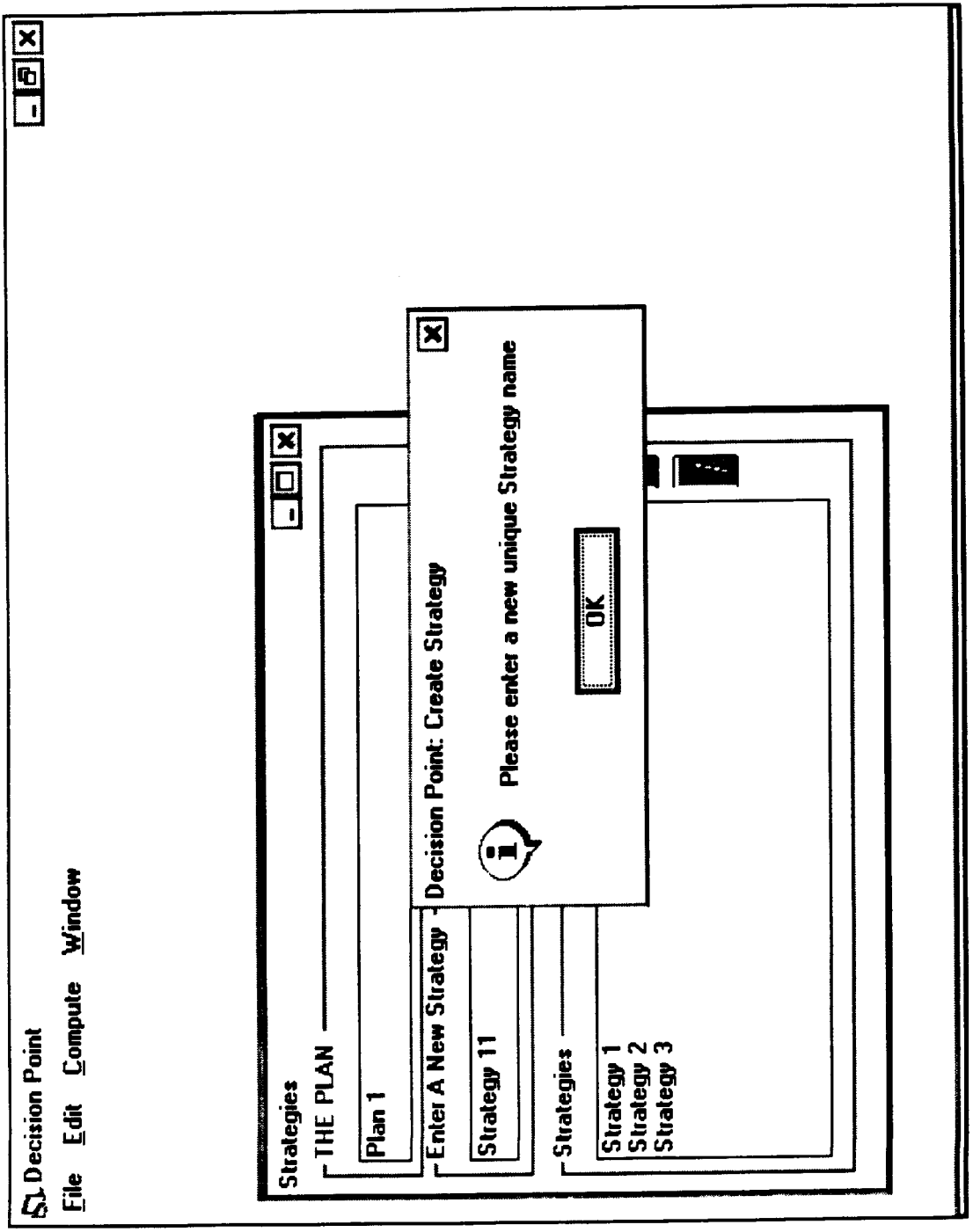
FIG. 11 is a display of the preferred embodiment of how the system would inform users of the uniqueness requirement when after they had entered a Strategy which had been previously defined and chosen not to use the earlier definition. Since the system enforces uniqueness it tells users that they must change the Strategy name since the name has already been taken.

If users enter a Strategy name which already appears in the given Plan's Strategy list the system will enforce uniqueness by notifying users and the system will not add the same Strategy to the list (FIG. 9). If users enter a Strategy name which does not appear in the current Plan's list but which has been previously defined and saved the system will notify users of the existence of a saved earlier definition and query users as to whether or not they would like to open the earlier saved definition to become a part of the current Plan (FIG. 10). If users respond affirmatively the system will retrieve the earlier saved definition and its underlying components, namely the saved Strategy's Objectives and the Objectives' underlying Alternatives and add them to the current Plan. If users choose not to open the earlier saved Strategy the system informs them of the uniqueness requirement as part of its basic instructions on how to proceed (FIG. 11).

Figure 12:
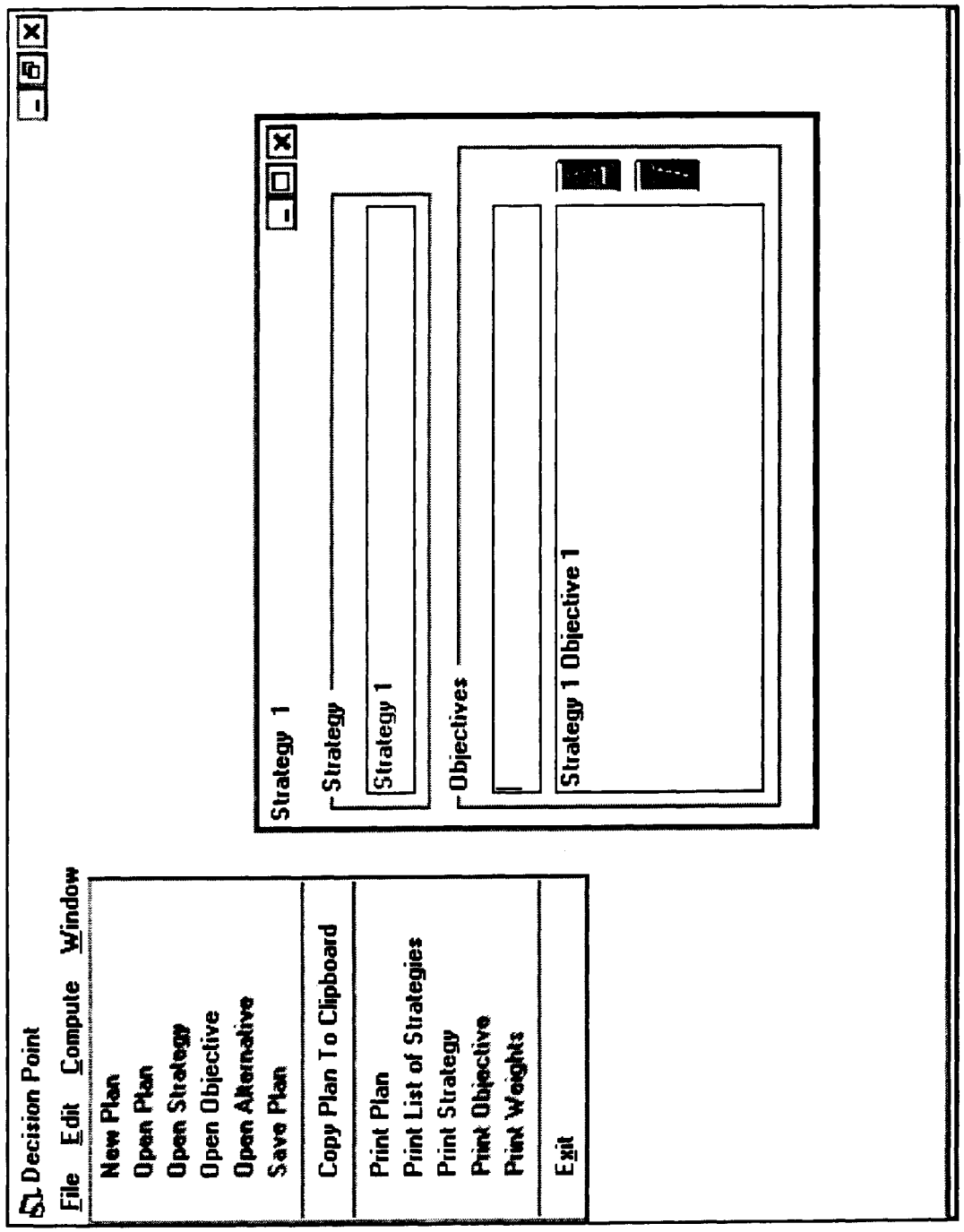
FIG. 12 is a display of the preferred embodiment of both the Strategy definition method and the method for Opening a predefined Objective to be a part of the Strategy being defined.

After defining the Strategy or Strategies of a Plan the next step in the process is to define an Objective or Objectives for each Strategy in the Plan. The method to do so is to select a Strategy from the Plan's Strategy list. This will lead the system to begin the definition process for the selected Strategy. In the preferred embodiment of the system selecting an item for defining (as opposed to for the "Delete" or "Change" commands) is done simply by double-clicking with a pointing device, e.g., a mouse, on a Strategy in the Plan's Strategy list. This brings up a new window whose caption reads "Strategy #" where the # sign is the actual number of the position of the Strategy in the Plan's list. A text box surrounded by a frame which is clearly labeled "Strategy" contains the name of the Strategy from the Plan's Strategy list which is being defined. A second frame clearly labeled "Objectives" contains a text box in which to enter Objectives, a listbox to hold the Objectives entered for the given Strategy and two arrow buttons for shifting Objectives up and down in order in the list (FIG. 12).

Figure 13:
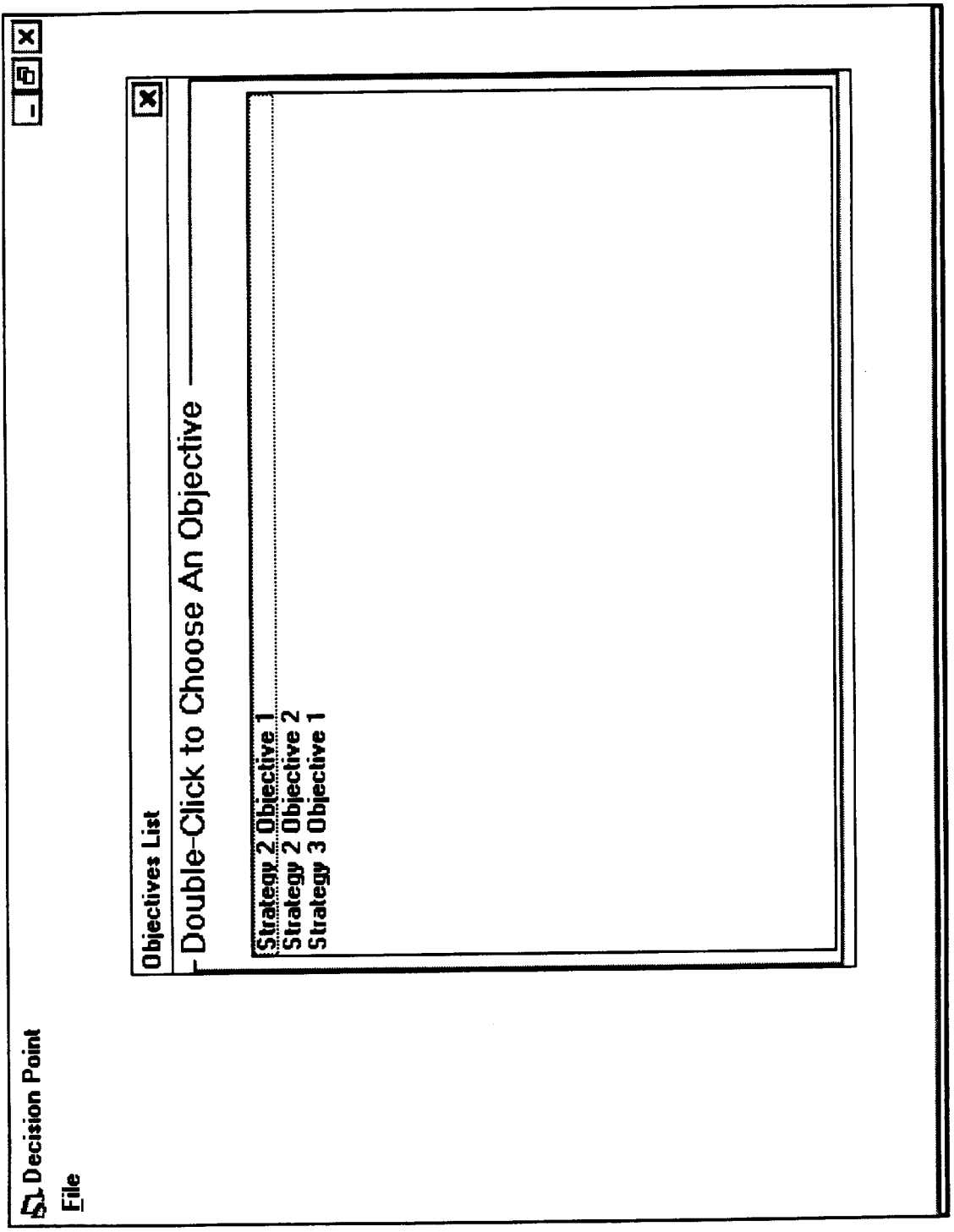
FIG. 13 is a display of the preferred embodiment of the method by which users may select previously defined Objectives to be a part of a Strategy.

When entering Objectives the system allows users to open previously defined and saved Objectives. In the preferred embodiment the system provides access to these commands via the command "Open Objective" underneath a "File" menu (FIG. 12). If users decide to use this command the system shows users a list of the Objectives defined and saved earlier by the system (FIG. 13). In the preferred embodiment this list is placed in a separate window clearly labeled "Objectives List." A frame labeled with instructions on how to select an Objective to open surrounds a listbox which contains the Objectives not already included in the Strategy for which the command is being employed. Users may select an Objective according to the instructions which read "Double-Click to Choose an Objective." By doing so the system will retrieve the Objective which had been defined and saved earlier and its underlying Alternatives if any and incorporate them into the Plan under the Strategy for which the Open Objective command was being employed.

Figure 14:
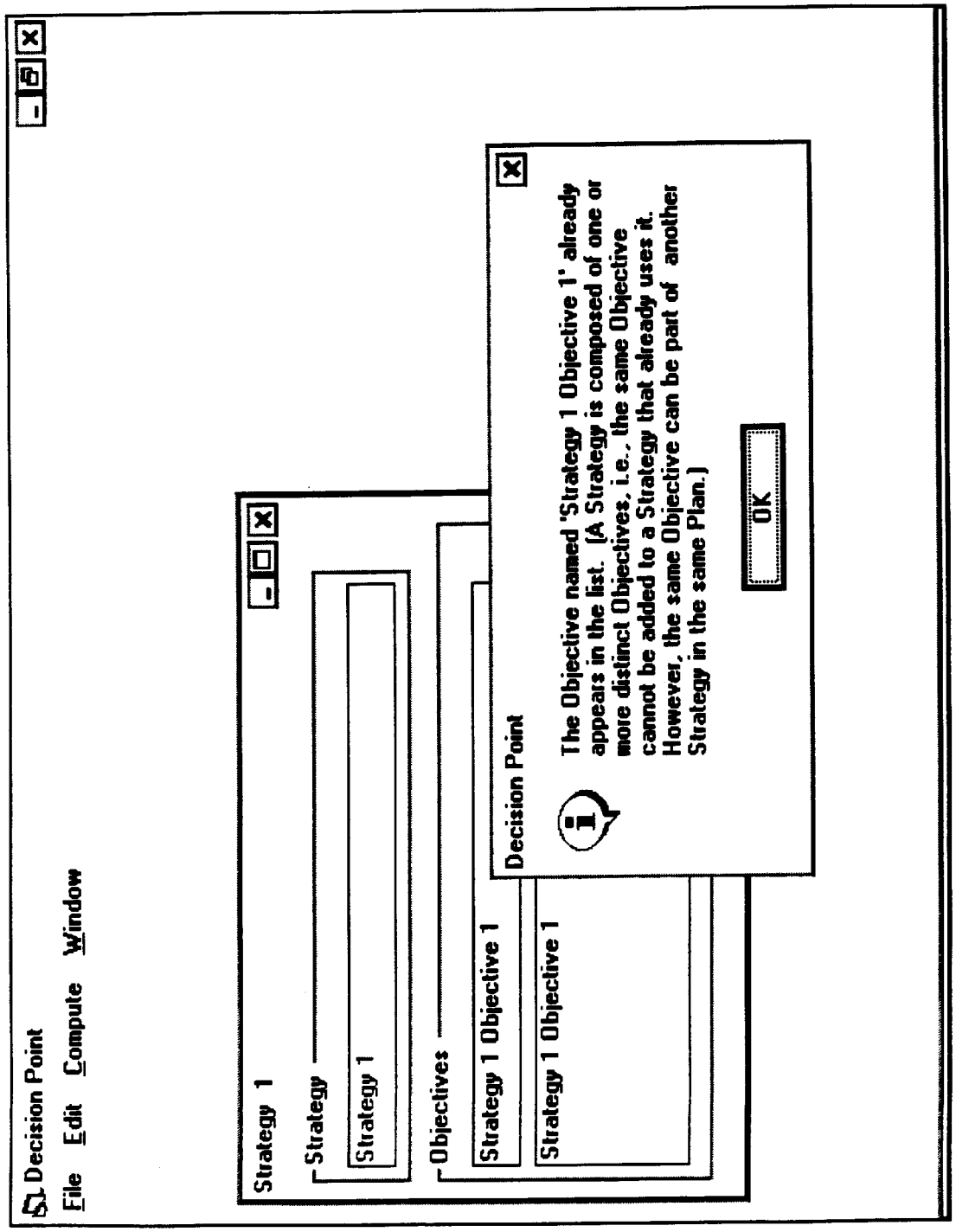
FIG. 14 is a display of the preferred embodiment of how the system would inform users when they had tried to enter the same Objective more than once into a Strategy.
Figure 15:
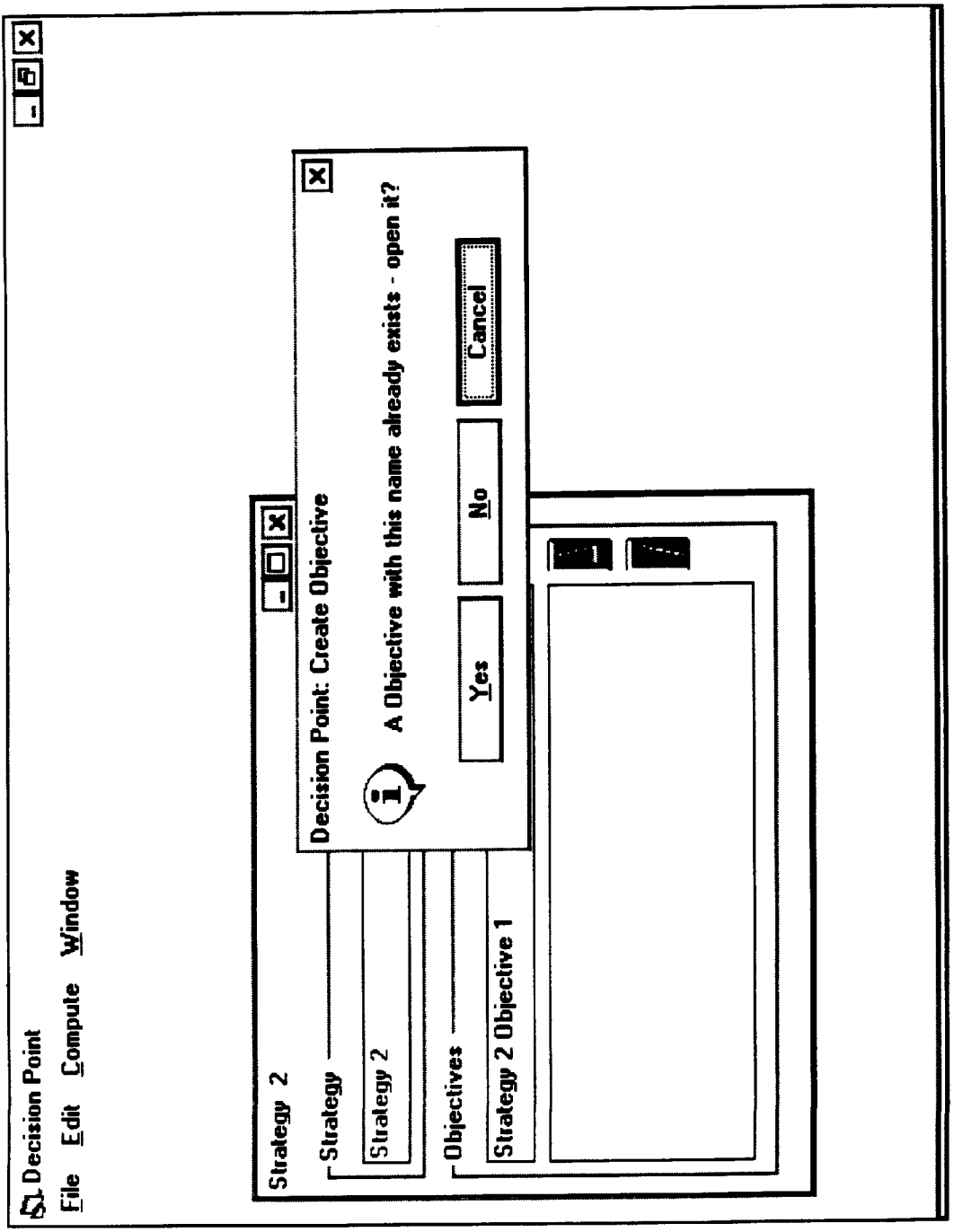
FIG. 15 is a display of the preferred embodiment of how the system would inform users when they had entered an Objective which was not "new" but rather had been defined previously.
Figure 16:
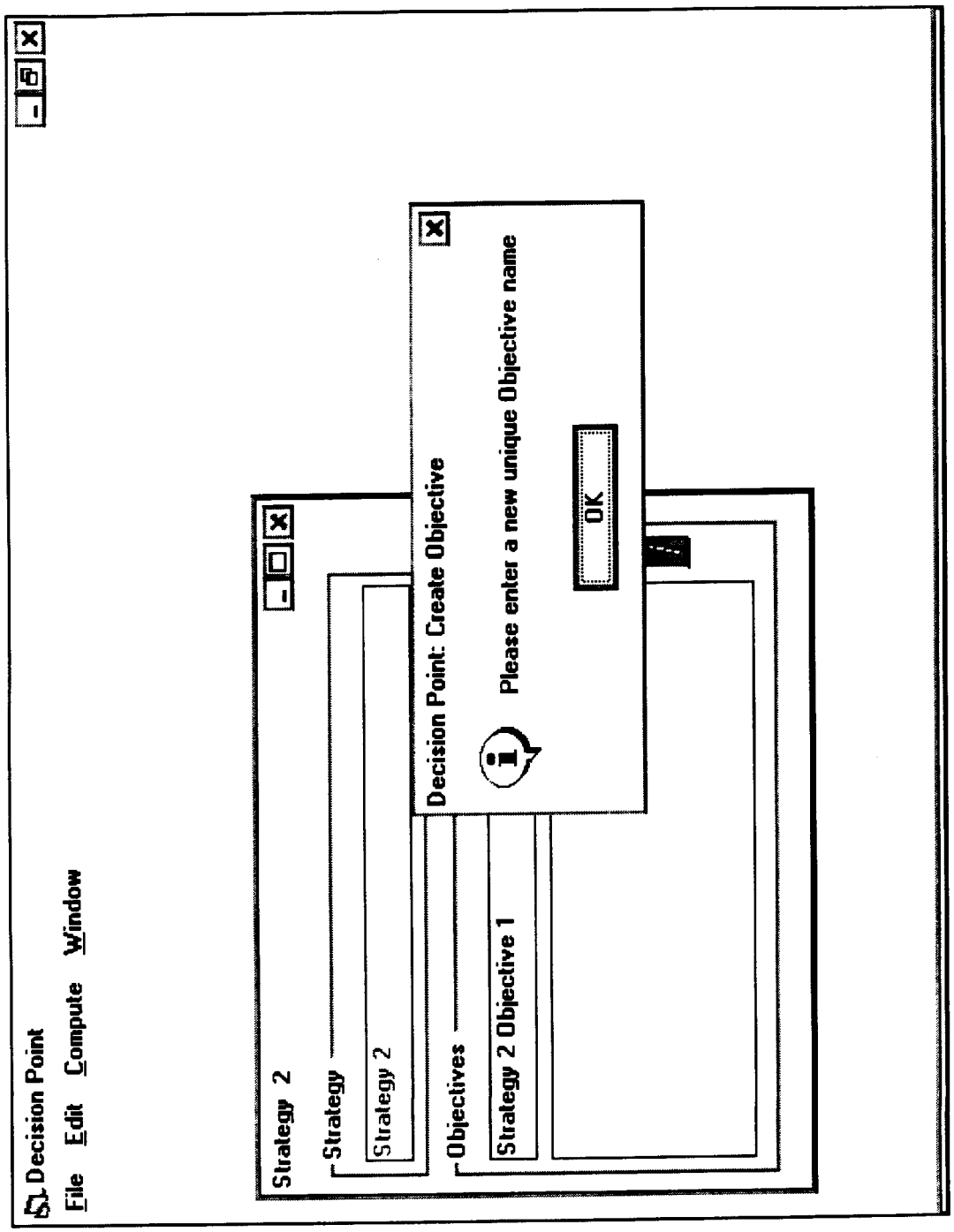
FIG. 16 is a display of the preferred embodiment of how the system would inform users of the uniqueness requirement when after they had entered a Objective which had been previously defined and chosen not to use the earlier definition. Since the system enforces uniqueness it tells users that they must change the Objective name since the name has already been taken.

If users enter an Objective name which already appears in the given Strategy's list the system will enforce uniqueness by notifying users and the system will not add the same Objective to the list (FIG. 14). If users enter an Objective name which does not appear in the current Strategy's list but which has been previously defined and saved the system will notify users of the existence of a saved earlier definition and query users as to whether or not they would like to open the earlier saved definition to become a part of the current Strategy (FIG. 15). If users respond affirmatively the system will retrieve the earlier saved definition and its underlying components, namely the saved Objective and the Objective's underlying Alternatives and add them to the current Strategy. If users choose not to open the earlier saved Objective the system informs them of the uniqueness requirement as part of its basic instructions on how to proceed (FIG. 16).

Figure 17:
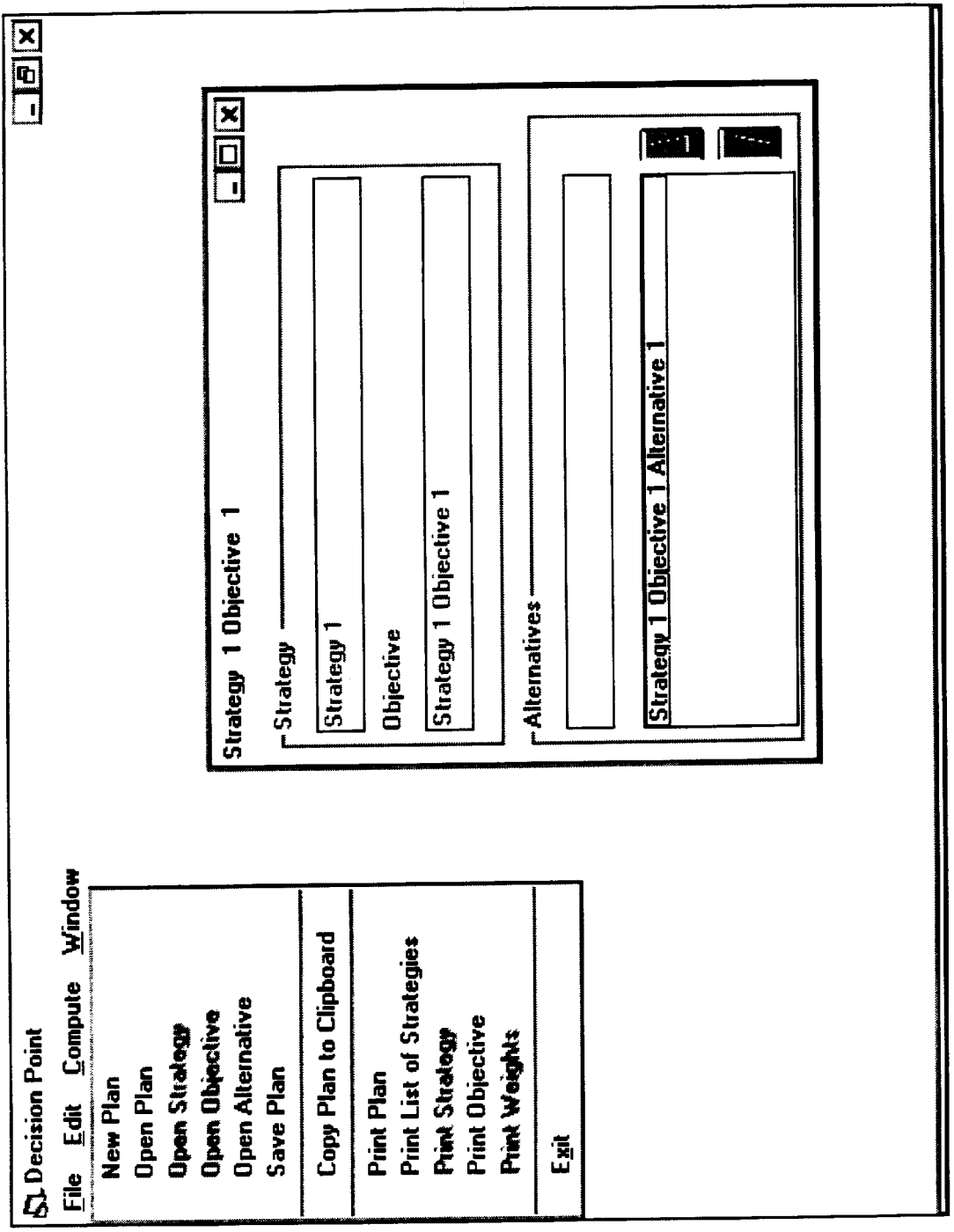
FIG. 17 is a display of the preferred embodiment of both the Alternative definition method and the method for Opening a predefined Alternative to be a part of the Objective being defined.
Figure 17B:
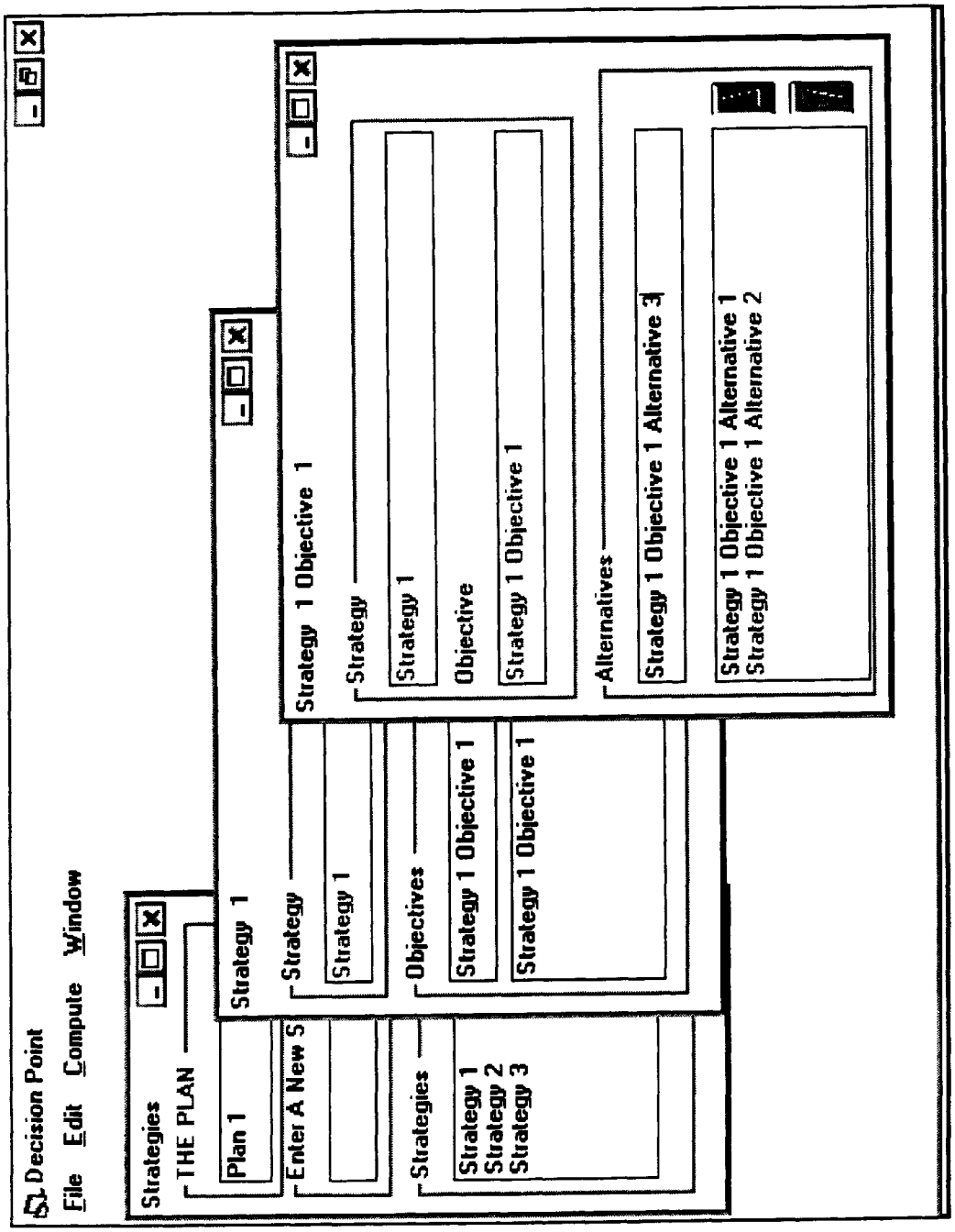
FIG. 17B is a display of the preferred embodiment of the method's means of allowing users to enter Alternatives into an Objective's list of underlying Alternatives.

After defining the Objective or Objectives of a Strategy the next step in the process is to define an Alternative or Alternatives for each Objective in the given Strategy. The method to do so is to select an Objective from the Strategy's Objective list. This will lead the system to begin the definition process for the selected Objective. In the preferred embodiment of the system this is done simply by double-clicking with a pointing device, e.g., a mouse, on and Objective in the Strategy's list. This brings up a new window whose caption reads "Strategy # Objective #" where the first # sign is the actual number of the position of the Strategy in the Plan's list and the second # sign is the actual number of the position of the Objective in the Strategy's list. A text box surrounded by a frame which is clearly labeled "Strategy" contains the name of the Strategy from the Plan's Strategy list and another frame labeled "Objective" with a text box which contains the name of the Objective from the Strategy's list which are being defined. A second frame clearly labeled "Alternatives" contains a text box in which to enter Alternatives, a listbox to hold the Alternatives entered for the given Strategy-Objective and two arrow buttons for shifting Alternatives up and down in order within the list of Alternatives (FIG. 17). FIG. 17B shows a new Alternative in the process of being entered in the system's preferred embodiment.

Figure 18:
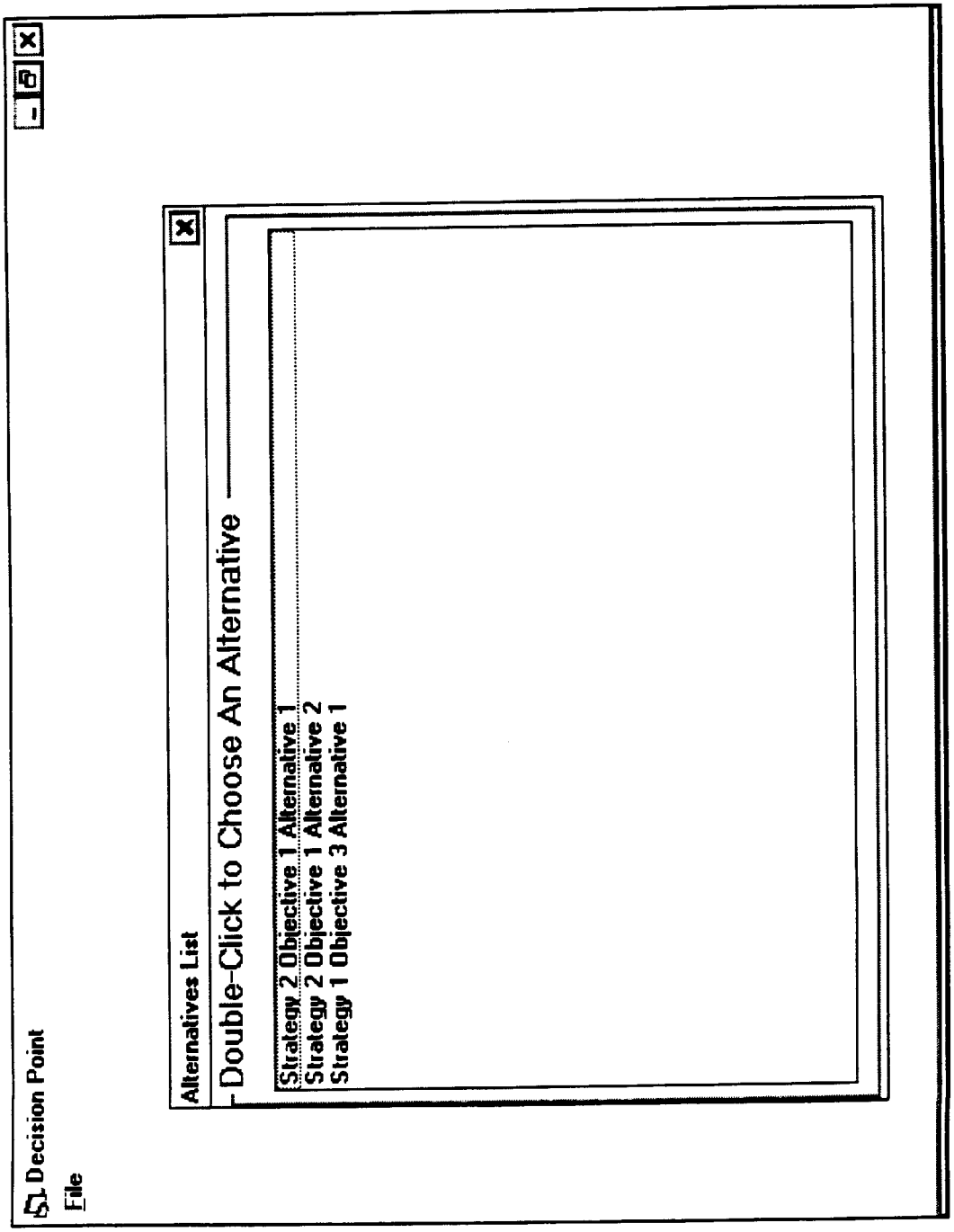
FIG. 18 is a display of the preferred embodiment of the method by which users may select previously defined Alternatives to be a part of an Objective.

When entering Alternatives the system allows users to open previously defined and saved Alternatives. In the preferred embodiment the system provides access to these commands via the command "Open Alternative " underneath a "File" menu (FIG. 17). If users decide to use this command the system shows users a list of the Alternatives defined and saved earlier by the system (FIG. 18). In the preferred embodiment this list is placid in a separate window clearly labeled "Alternatives List." A frame labeled with instructions on how to select an Alternative to open surrounds a listbox which contains the Alternatives not already included in the Strategy-Objective for which the command is being employed. Users may select an Alternative according to the instructions which read "Double-Click to Choose an Alternative." By doing so the system will retrieve the Alternative which had been defined and saved earlier and incorporate it into the Plan under the Strategy-Objective for which the Open Alternative command was being employed.

Figure 19:
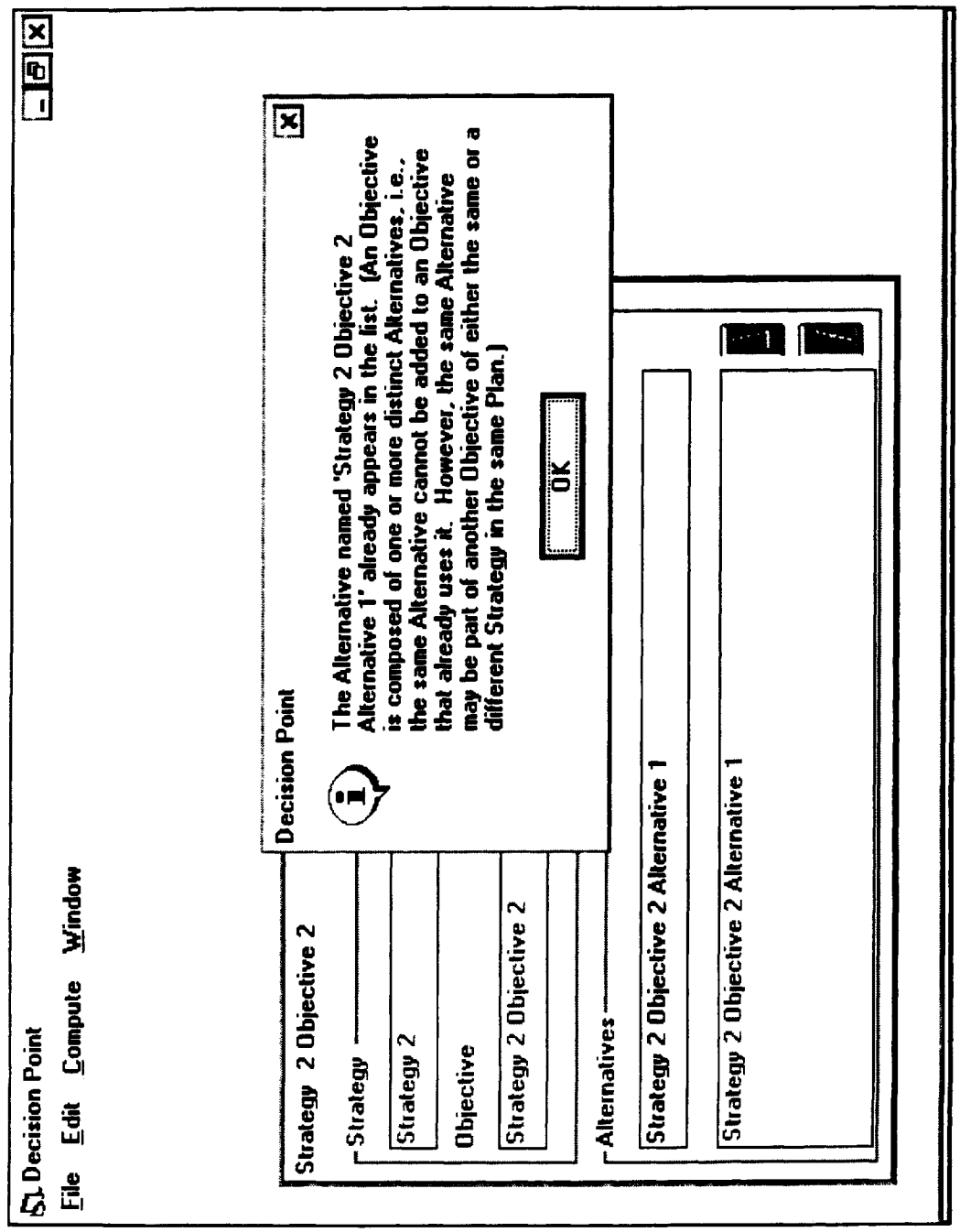
FIG. 19 is a display of the preferred embodiment of how the system would inform users when they had tried to enter the same Objective more than once into a Strategy.
Figure 20:
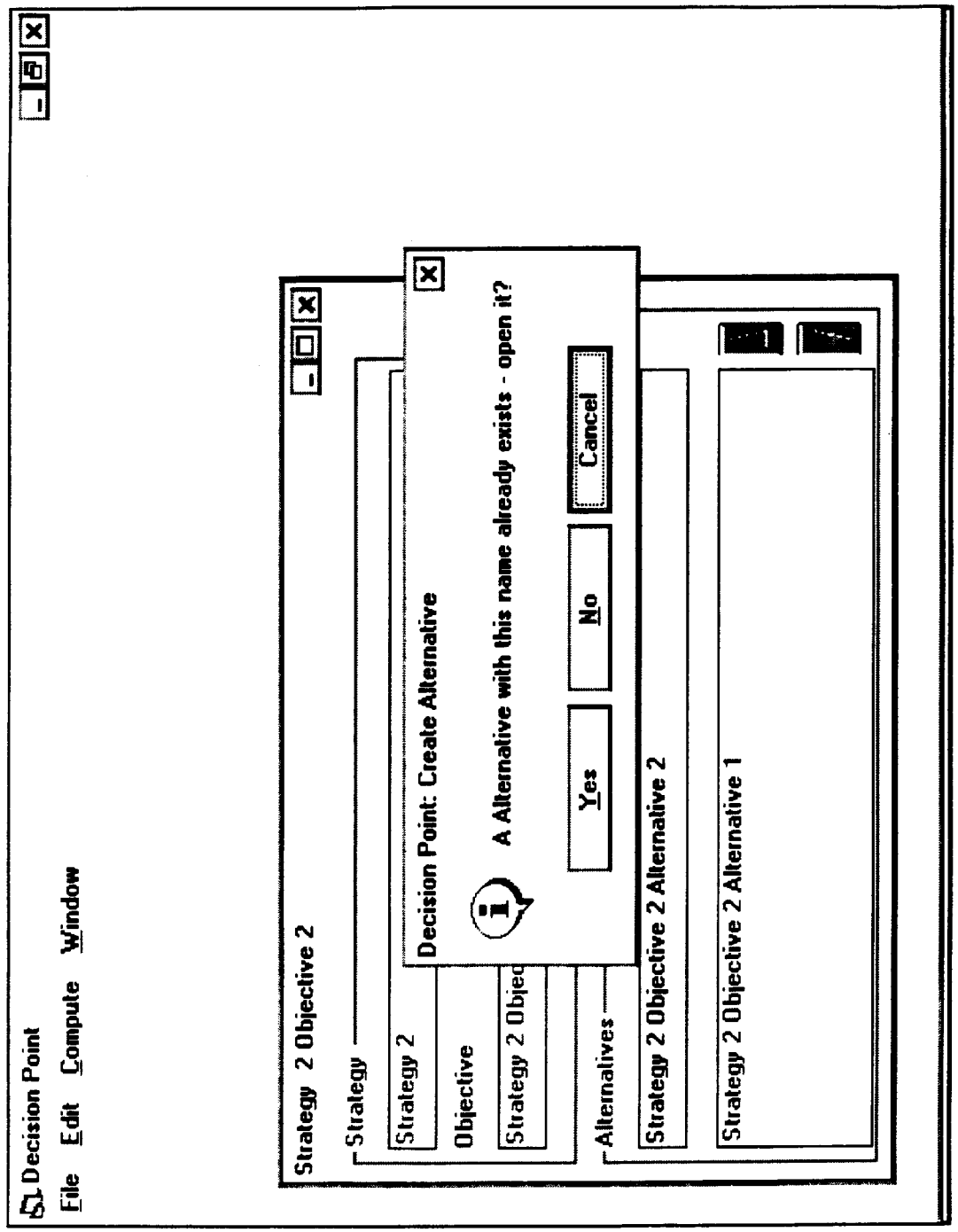
FIG. 20 is a display of the preferred embodiment of how the system would inform users when they had entered an Alternative which was not "new" but rather had been defined previously.
Figure 21:
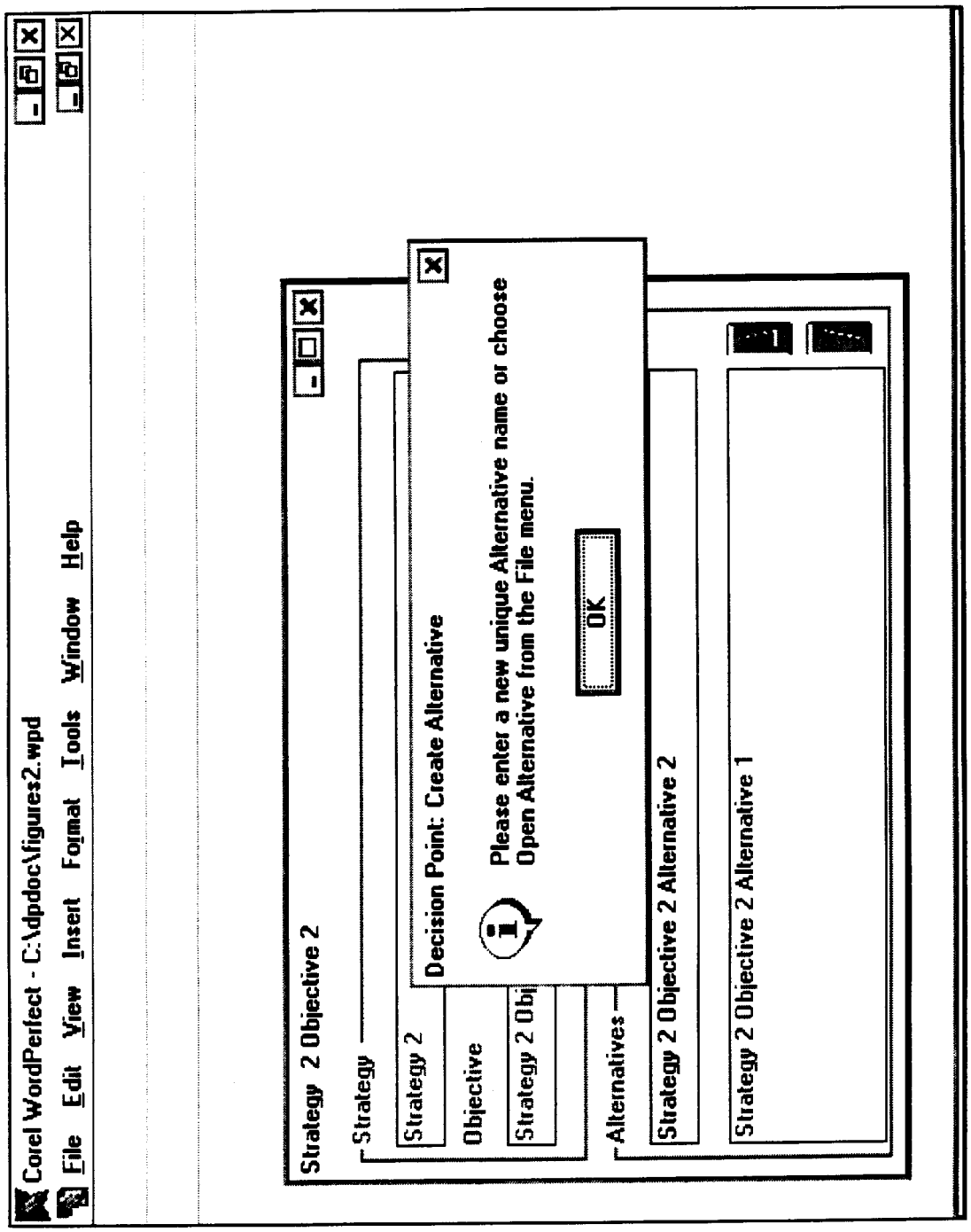
FIG. 21 is a display of the preferred embodiment of how the system would inform users of the uniqueness requirement when after they had entered a Alternative which had been previously defined and chosen not to use the earlier definition. Since the system enforces uniqueness it tells users that they must change the Alternative name since the name has already been taken.

If users enter an Alternative name which already appears in the given Strategy-Objective's list the system will enforce uniqueness by notifying users and the system will not add the same Alternative to the list (FIG. 19). If users enter an Alternative name which does not appear in the current Strategy-Objective's list but which has been previously defined and saved the system will notify users of the existence of a saved earlier definition and query users as to whether or not they would like to open the earlier saved definition to become a part of the current Strategy-Objective's Alternatives list (FIG. 20). If users respond affirmatively the system will retrieve the earlier saved definition, namely the saved Alternative and add it to the current Strategy-Objective. If users choose not to open the earlier saved Alternative the system informs them of the uniqueness requirement as part of its basic instructions on how to proceed (FIG. 21).

Figure 22:
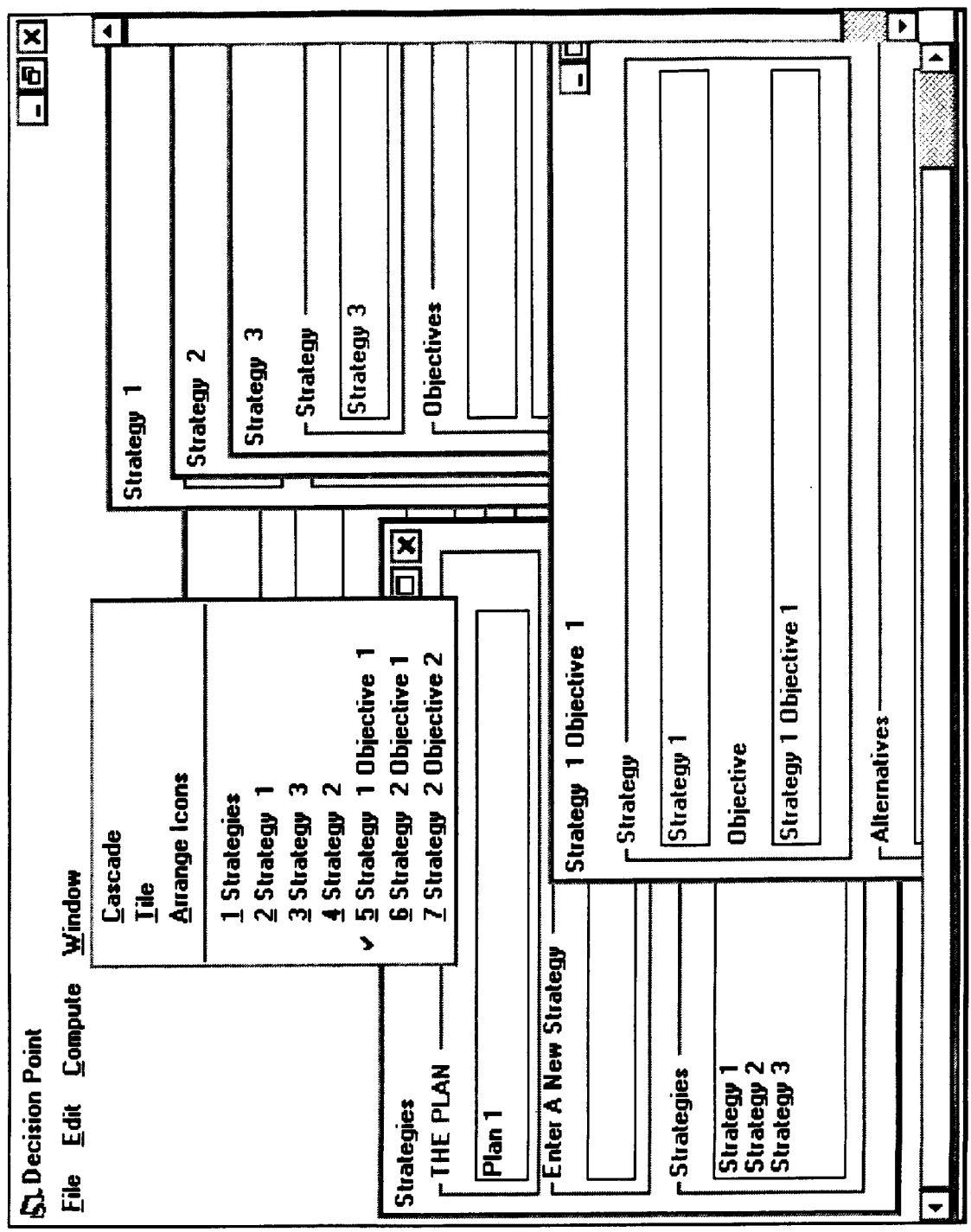
FIG. 22 is a display of the preferred embodiment of how the system would employ a Graphics User Interface's capabilities to further organize the data within an interface which supports a window environment.

FIG. 22 shows how, in the preferred embodiment of the system, the system would make use of the natural capabilities of a Graphic User Interface's window environment to provide capabilities to neatly arrange and access its Plan's, Strategies' and Objectives' definition windows via a "Window" menu which provided the options of arranging the windows in the well known Cascade or Tile fashions, and/or arranging the windows' icons as well as providing a list of the open components' windows accessible and providing an access index method to said windows, i.e., the underlined numbers next to each window's name in the lower half of the menu shown.

Returning to the beginning, if users had selected Open Plan (FIG. 2) and opened a previously defined and saved Plan the system in its preferred embodiment would look up all the Plan's components in the Links relational database table (FIG. 24), retrieve the Plan's components' names from the Objects relational database table (FIG. 25) and create, open and fill windows for the Plan, its Strategies, Objectives and their Alternatives.

The system and method can be implemented on most computer systems with many available programming languages. It is not limited to a single platform or language. In the preferred embodiment the computer system and programming language chosen by implementers would allow the realization of the preferred embodiment as described above, meaning that the system and language would support a graphic users interface which supports windows and relational database programming. However, the system and method could be implemented on a "text" system basis as was done before the advent of graphic user interfaces as is well known to developers of average skill and experience. The same is true for saving the definitions of Plans' components. While the preferred embodiment and state-of-the-art is to employ a database system, the database system could be any model, not just relational, or a flat-file storage system for that matter, any of which storage methods are well known to developers of average skill and experience.

In the opening paragraphs this description described how the preferred embodiment of the system would perform certain operations with the relational database tables shown in FIGS. 23, 24, 25 and 26. Here follows a description of the tables themselves and how the preferred embodiment of the system and method employs them.

FIG. 23 shows the preferred embodiment's relational database table called "indexes". It has two columns, "type" and "id" and a unique index on the "type" column. The system and method presets rows to serve as indexes for all the components. The set of "type"s is (Plan, Objective, Strategy, Alternative). Each "type"'s initial "id" value is set to the lowest possible Long Integer supported by the computer system upon which the system is implemented (e.g., –2,000,000,000). Whenever a new component is created the "id" for that "type" of component is retrieved from this table and assigned to that component. Then the "id" for that "type" is incremented once so that the next component of the identical "type" will have a new "id". For example, let's say the "id" for "type" Alternative was currently set to 1 and a user created a new Alternative called "New Alt". The system would look up the row in the indexes table where the "type" was equal to "Alternative" and retrieve that row's "id" value. In this case it would retrieve the "id" value of 1 and assign that value to the new Alternative called "New Alt". It would then update the "id" value to the value of 2 for the row whose "type" was equal to "Alternative". The Alternative after this one would be assigned the "id" value of 2 and then the system would increment the "id" value to 3.

FIG. 25 shows the preferred embodiment's relational database table called "objects" which is the table which holds all the Plan, Objective, Strategy and Alternative names defined and saved by the system. It has three columns, "type", "id" and "name" and two indexes: a unique index on "type"+"id" and a unique index on "name"+"type", meaning, the table's very definition enforces two rules of integrity that the system must enforce:

1. There can be no duplicate objects of any "type" with the same "id" assigned to it. E.g., there can not be two Alternatives with the "id" value of 2; their "id" values must be different which the system both maintains and enforces.
2. There can be no duplicate objects which have the same "name" and are of the same "type". E.g., there can not be two Alternatives with the name "XYZ".

All Plan components are stored in the "objects" table. So, in the case of our earlier, example, if a user had created an Alternative named "New Alt" and the system had assigned it an "id" value of 1 the system's next step is to insert an entry for it in the "objects" table. Its row would have a "type" of 'A' (for Alternative), "id" of 1 (its system assigned id value) and a name of "New Alt". The other codes for the "type" column are 'O' for Objective, 'P' for Plan, and 'S' for Strategy. The "objects" table is the table the system uses whenever it needs to see if a component of a particular "type" already has a previously defined and saved definition. That saved definition is to be found in this table if it exists. This is the only place where the components' "names" are stored. All retrieval activities use relational database methodology to retrieve the names on the basis of the component's "id" and "type".

FIG. 24 shows the preferred embodiment's relational database table called "links" which is the table which holds all the system's saved Plans' structures. Plans and their subcomponents are stored in the "links" table in a hierarchical fashion.

A comprehensive example will now be expostulated. While previous point-by-point examples employed component names such as "Plan 1", "Alternative 2" and the like, in practice the names would be more content-oriented and would convey indications of what the various plan components consist of. (It will be recalled, with reference to the foregoing discussion of the Objects table (FIG. 25) that the name field provides 255 characters of text, allowing for full descriptions.)

Figures 27A, 27B:
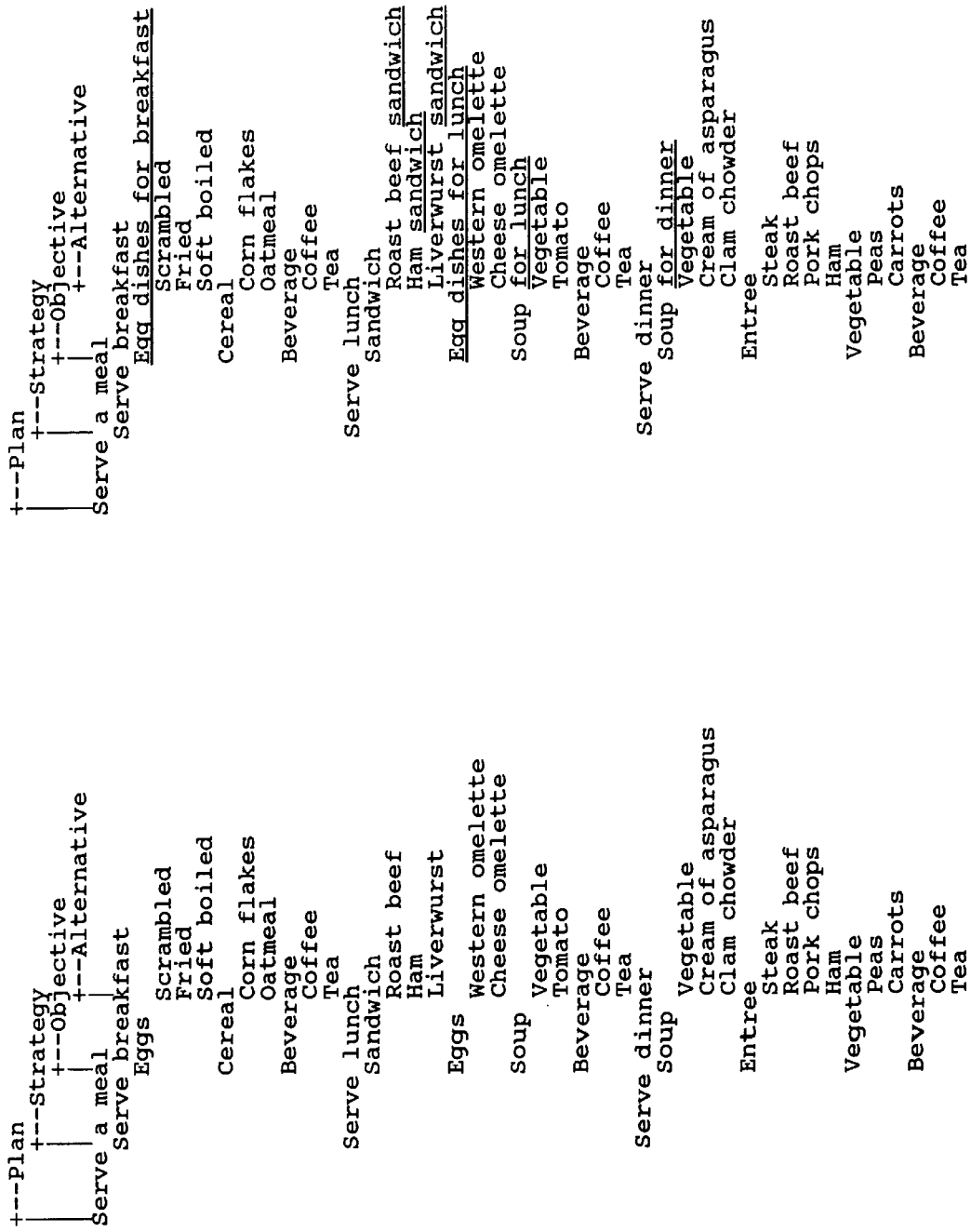

To avoid possible distractions from the complexity of a sample plan itself, a sample plan with deliberately rudimentary subject matter will be discussed. Depicted in FIG. 27a is such a plan. The plan name is seen to be "Serve a meal", and it is seen to offer three different strategies: "Serve breakfast", "Serve lunch", and "Serve dinner". Each strategy has its objectives a selection of possible meal courses, and each objective has as its alternatives the assumed available or user-intended alternatives for each course. It is assumed that the plan depicted in FIG. 27a has been conceived by a user and that he wishes to enter it into the system of the present invention. As will be seen further below, the example plan contains some ambiguities in order that it may be shown how the system of the present invention detects them, informs the user of them, and leads the user to resolutions of them. FIG. 27b depicts the example plan with the ambiguities resolved; underlined text in FIG. 27b indicates changes that had to be made to eliminate ambiguities.

To retain simplicity, it is assumed that the example plan is the first and only plan to be entered into the system. The entry of a second plan would entail considerations analogous to those of entering multiple components at other levels and thus need not be discussed in detail. Prior to commencement of the entering of the example plan, and there being no other plan entered, the Objects and Links tables are empty. Also for simplicity it will be assumed that the four indexes in the Indexes table are initially equal to 1, although it has been discussed above that in a preferred embodiment they are equal to the largest negative number that may be stored in a long integer.

In order to enter the example plan, the user invokes the system of the present invention and as shown in FIG. 1 is asked to enter a plan name. He enters "Serve a meal", whereupon the system interrogates the Objects table to determine whether there already is a plan having that name. The objects table being empty as previously noted, it is deemed permissible to store the plane name as entered, and it will thus be stored in the Objects table (FIG. 25). Three fields are seen in FIG. 25 to be required: a type (one character of text) for which the present invention provides a "P" (for "Plan", since it is currently at the level of entering a plan name); an ID (a long integer) for which a 1 is retrieved (referring to FIG. 23) from the Indexes table at the id field of the record which contains "plan" in its type field; and a name, which now contains "Serve a meal" as entered by the user.

After retrieving a 1 as discussed from the Indexes table, the ID field in the Indexes table for type "Plan" is incremented to 2.)

FIG. 28a depicts the Objects table as it will be after entering the present example plan. As will be discussed, the entries shown in FIG. 28a do not reflect the names as entered, but as corrected to resolve ambiguities in the example plan of FIG. 27a. The processing discussed thus far will have resulted in making entry a) in FIG. 28a. FIG. 28b tracks the contents of the Indexes table during entry of the present example plan. The four indexes in it are shown to initially all be equal to 1; it is seen that after the processing discussed thus far, the Index corresponding to type "Plan" has been incremented to 2.

The user is then presented with a screen like that shown in FIG. 4 (except that it names "Serve a meal" as the "THE PLAN" and it does not list anything in the Strategies box, there being none yet defined). The user enters the name of a strategy, "Serve breakfast", in the "Enter a New Strategy" box. The Objects table is checked to determine whether there already is an entry having type "s" (strategy) and the name just entered; there is not, so the name just entered is stored. That is, the Objects table is updated with entry b).

Because the strategy "Serve breakfast" was entered while the current plan is "Serve a meal", that strategy must be hierarchically subservient to that plan; this relationship is noted in the Links table, the form of which has been depicted in FIG. 24, and the contents of which after entry of the present example is depicted in FIG. 29. The entry of the strategy "Serve breakfast", in addition to resulting in entry b) in the Objects table, also results in entry a) in the Links table shown in FIG. 29. The entry indicates that there is a "child" entry having a CTYPE (child type) of "s" and CID (child ID) of 1; the Objects table indicates that this is the strategy named "Serve breakfast" that was just entered. The entry also indicates that there is a "parent" having a PTYPE (parent type) of "p" and a PID (parent ID) of 1; the Objects table shows this to be the current plan, "Serve a meal". That these two objects are mentioned in the same Links entry states that they are hierarchically linked.

Similarly, the user enters the strategies "Serve lunch" and "Serve dinner", which result in entries c) and d) in the Objects table (FIG. 28a) and entries b) and c) in the Links table FIG. 29). The Order field in the Links table determines the order in which the three strategies are listed in a window similar to that shown in FIG. 4. Referring to FIG. 7, the user can change the listing order by clicking on a strategy so that it is highlighted, and then clicking on the up-arrow or down-arrow buttons to move it up or down in the list respectively. The entries in the Order field of the Links table are altered accordingly.

The user may now begin to enter the objectives under the strategies. To make entries under the "Serve breakfast" strategy, in the window comparable to that of FIG. 4 he would double-click on the entry "Serve breakfast". This would result in the display of a new window like that shown in FIG. 12. The new window is captioned "Strategy 1" because "Serve breakfast" was the first strategy listed; it includes a strategy box containing the strategy name "Serve breakfast", an objectives box where new objectives may be named, and a list box for displaying a list of already-entered objectives; the latter is empty at this point.

The user enters "Eggs" in the objectives box; the system checks whether an objective of that name already exists; since none does, the new objective is stored by making entry e) in the Objects list (FIG. 28a). The entry is initially made with "Eggs" as the name; changing the name to "Breakfast egg dishes" as shown in FIG. 28a will be discussed further below. Establishing the hierarchical link of this objective to the strategy "Serve breakfast" is accomplished by making entry d) in the Links table (FIG. 29).

Similarly, the user enters "Cereal" and "Beverage" as objectives under the strategy "Serve breakfast", which result in entries f) and g) in the Objects table and entries e) and f) in the Links table.

The user may now enter alternatives under the entered objectives. In the window comparable to FIG. 17 he may double-click on objective "Eggs" which would appear in the list box, which results in opening a new window comparable to that shown in FIG. 17, captioned "Strategy 1 Objective 1", displaying "Serve breakfast" in the Strategy box, "Eggs" in the Objective box, and nothing in the list box since no alternatives are yet defined. The user enters "Scrambled", then "Fried", and finally "Soft-boiled" in the Alternatives box. Since no alternatives with those names exist already, they are permissible and they are stored by making entries h) i) and j) in the Objects table and entries g) h) and i) in the Links table.

The user now works his way back to the window comparable to FIG. 17, where he double-clicks on "Cereal" in order to enter the alternatives under it (In a typical GUI (graphical user interface) platform, previous windows are at least partially visible (though perhaps "iconized") and are available for reselection by "clicking" with a pointing device.) He enters alternatives of "Corn flakes" and "Oatmeal", which result in entries k) and l) in the Objects table and entries j) and k) in the Links table.

Similarly the user specifies that he is entering alternatives under objective "Beverage", and enters "Coffee" and "Tea", which result in entries m) and n) in the Objects table and entries l) and m) in the Links table.

The user now gets back to a window in which he may select the strategy "Serve lunch" in order to begin entering the objectives and alternatives under it. In a window like that depicted in FIG. 4, the user double-clicks on the strategy "Serve lunch", and is shown a window like that of FIG. 12, captioned "Strategy 2" and displaying "Serve lunch" in the strategy box. He enters "Sandwich" in the alternatives box which results in entry o) in the Objects table and entry n) in the Links table.

Now he enters the next item from his plan (FIG. 27a), namely "Eggs", in the objectives box in the FIG. 12 window. As always, a check is made whether there already is an entry with the entered name at the current type, namely "Objectives". In this case, the check comes up positive—note that entry e) in the Objects table meets those criteria. By a screen comparable to that of FIG. 15 the user is informed that an objective of the entered name already exists, and he is asked whether he wishes to use it. The user now realizes that his plan (FIG. 27a) contains this ambiguity; let's say he decides to change the objective under "Serve breakfast" from "Eggs" to "Egg dishes for breakfast" and the alternative under "Serve lunch" from "Eggs" to "Egg dishes for lunch". In response to the prompt in the window comparable to FIG. 15, he specifies "No", indicating that he does not wish to use the existing objective named "Eggs". He is then shown a window like that of FIG. 16 and is instructed to enter a new unique name for the objective he is currently entering. It is assumed that he enters "Egg dishes for lunch", which results in entry p) in the Objects table and entry o) in the Links table.

To make the corresponding change under "Serve breakfast", he can pull down the Edit menu as shown in FIG. 8, select "Change", and double-click on the strategy "Serve breakfast", whereupon he is shown a screen like that of FIG. 8c, in which he can change "Eggs" to "Egg dishes for breakfast" and select "OK".

By the means already discussed, the user proceeds to enter the objective "Soup" under strategy "Serve lunch" which results in entry q) in the Objects table and entry p) in the Links table. Similarly, he enters "Beverage" as an objective under strategy "Serve lunch". An objective with this name already exists as entry g) in the Objects table so the user is presented with a screen like that of FIG. 15. Unlike the aforementioned ambiguity involving "Eggs", this case does not represent an ambiguity—the user intends the objective "Beverage" to contain the same alternatives under the "Serve lunch" strategy as it does under the "Serve breakfast" strategy. So in response to the screen of FIG. 15 he indicates "Yes", which does NOT result in any new entry in the Objects table, but which does result in entry q) in the Links table.

By the means already discussed, the user then enters the alternatives under the objectives "Sandwich", "Egg dishes for lunch", and "Soup", which results in entries r) through x) in the Objects table and entries r) through x) in the Links table. No entries need be made to specify "Coffee" and "Tea" or to link them to "Beverage", since that is done already in entries m) and n) of the Objects table and entries l) and m) of the Links table.

And similar to the above, the user then returns to the strategy "Serve dinner" and proceeds with entry of the objectives "Soup", "Entree", "Vegetable", and "Beverage" thereunder. When he enters "Soup" he is informed that an objective with that name exists already; refer to entry q) in the Objects table. Like the case above with "Eggs", he may elect to instead enter an objective name of "Soup for dinner", and to edit the name at entry q) of the objects table to "Soup for lunch". His entering of "Soup for dinner", "Entree", and "Vegetable" result in entries y) through aa) in the objects table and y) through aa) in the Links table. Upon his attempt to enter "Beverage", the same thing happens as when he entered it under "Serve lunch"—no entries need be made in the Objects table, and only entry ab) is made in the Links table.

Further, the user then enters the alternatives under the objectives just entered under the strategy "Serve dinner". Under the objective "Soup for dinner" it should be noted that the entry of "Vegetable" does NOT result in an ambiguity with the name "Vegetable" at entry aa) in the Objects table, since the two occurrences are at different levels—one is an objective and one is an alternative.

When the user enters "Vegetable" as an alternative under "Soup for dinner" the system will determine that there already is an alternative with that name and will present him with a screen like that of FIG. 20, asking him if he wishes to open the existing alternative; since he wishes to enter the same vegetable soup, he will respond in the affirmative. No entry need be made in the Objects table, and entry ac) is made in the Links table. The entries of "Cream of asparagus" and "Clam chowder" result in entries ab) and ac) in the Objects table and ad) & ae) in the Links table.

Under "Entrees", the attempts to enter "Roast beef" and "Ham" will, as discussed above in connection with the entry of "Eggs", result in the flagging of ambiguities because there are already alternatives with these names at entries r) and s) of the Objects table. It will be assumed that the user goes back and edits alternatives "Roast beef", "Ham", and "Liverwurst" under strategy "Serve lunch", objective "Sandwich" to "Roast beef sandwich", "Ham sandwich", and "Liverwurst sandwich" respectively in order to overcome these ambiguities. The corresponding entries in the Objects table are entries r), s), and t).

The entry of the "Entree" alternatives results in entries ad) through ag) in the Objects table, and af) through ai) in the Links table. The entry of the "Vegetable" alternatives results in entries ah) and ai) in the Objects table and entries aj) and ak) in the links table.

Those skilled in the art will appreciate that the invention may be embodied in other specific forms, and is intended to be embraced by the following claims rather than limited by the foregoing particular embodiments

I claim:

1. A method of enforcing uniqueness of names among objects in hierarchical levels, comprising the steps of:
   a) selecting one of a plurality of hierarchical levels each having an associated designation;
   b) eliciting entry of a name to be associated with an object at said selected one hierarchical level;
   c) in response to said entry, checking said selected one hierarchical level to determine whether said name is unique within said selected one hierarchical level;
   d) in response to determining said name to be unique, storing said name and associating said name with said object;
   e) in response to determining said name to be redundant and therefore other than unique, making an indication and denying storage of said name from step (b) within said selected one hierarchical level.

2. A method as in claim 1, wherein said indication includes generating a display of said names already associated with said selected one hierarchical level.

3. A method as in claim 1, wherein said step of checking entails comparing said name with those associated with said designation.

4. A method as in claim 1, wherein said indication includes eliciting correction of one of said name and those that are redundant, and in response to entry of said correction, checking whether said correction is unique within said selected one hierarchical level and, if so, carrying out step (d) with said correction being said name and, if not, carrying out step (e) with said correction being said name.

5. A method as in claim 1, wherein the step of eliciting includes generating a display.

6. Circuitry for enforcing uniqueness of names among objects in hierarchical levels, responsive to programming that:
   a) selects one of a plurality of hierarchical levels each having an associated designation;
   b) elicits entry of a name to be associated with an object at said selected one hierarchical level;
   c) in response to said entry, checks said selected one hierarchical level to determine whether said name is unique within said selected one hierarchical level;
   d) in response to determining said name to be unique, stores said name and associates said name with said object;

e) in response to determining said name to be redundant and therefore other than unique, makes an indication and denying storage of said name from step (b) within said selected one hierarchical level.

7. Circuitry as in claim 6, wherein said indication includes a display of said names already associated with said selected one hierarchical level.

8. Circuitry as in claim 6, wherein said programming checks by comparing said name with those associated with said designation.

9. Circuitry as in claim 6, wherein said indication includes programming that elicits correction of one of said name and those that are redundant, and in response to entry of said correction, checks whether said correction is unique within said selected one hierarchical level and, if so, carries out step d) with said correction being said name and, if not, carries out step e) with said correction being said name.

10. Circuitry as in claim 6, wherein said programming carries out step b) by including generation of a display.

11. A computer that enforces uniqueness of names among objects in hierarchical levels, comprising programming that:
   a) selects one of a plurality of hierarchical levels each having an associated designation;
   b) elicits entry of a name to be associated with an object at said selected one hierarchical level;
   c) in response to said entry, checks said selected one hierarchical level to determine whether said name is unique within said selected one hierarchical level;
   d) in response to determining said name to be unique, stores said name and associates said name with said object;
   e) in response to determining said name to be redundant and therefore other than unique, makes an indication and denying storage of said name from step b) within said selected one hierarchical level.

12. A computer-readable medium whose contents cause a computer system to enforce uniqueness of names among objects in hierarchical levels, comprising programming that:
   a) selects one of a plurality of hierarchical levels each having an associated designation;
   b) elicits entry of a name to be associated with an object at said selected one hierarchical level;
   c) in response to said entry, checks said selected one hierarchical level to determine whether said name is unique within said selected one hierarchical level;
   d) in response to determining said name to be unique, stores said name and associates said name with said object;
   e) in response to determining said name to be redundant and therefore other than unique, makes an indication and denying storage of said name from step b) within said selected one hierarchical level.

13. A computer-readable memory device encoded with a data structure for transferring data between a client program and a server program during a remote procedure call, the server program having functions for invocation by the client program, the functions having associated parameters, the data structure having entries each containing:
   a parameter value corresponding to one of the associated parameters that is transferred from the client program to the server program when one of the functions is invoked, said functions including
   a) selecting one of a plurality of hierarchical levels each having an associated designation;
   b) eliciting entry of a name at said selected one hierarchical level;
   c) in response to said entry, checking said selected one hierarchical level to determine whether said name is unique within said selected one hierarchical level;
   d) in response to determining said name to be unique, storing said name and associates an increment to said name;
   e) in response to determining said name to be redundant and therefore other than unique, making an indication and denying storage of said name from step b) within said selected one hierarchical level.

14. A method for enforcing integrity for use with a hierarchical arrangement of objects in which:
   each object is associated with a hierarchical level of a predetermined number of hierarchical levels;
   each object has a name distinct from the names of other objects associated with the same level;
   users can create and modify objects; and
   users can selectively associate an object with an object at the next higher level, the object at the next higher level being called a parent and the object thus associated being called a child, the method comprising the steps of:
   (a) selecting a hierarchical level;
   (b) eliciting from a user an object name at the selected hierarchical level;
   (c) in response to entry of the object name, determining whether the object name is unique at the selected hierarchical level by searching object names previously associated with the selected hierarchical level and proceeding to step (h) if the entered object name is unique at the selected hierarchical level;
   (d) reporting to the user that the entered object name is not unique at the selected hierarchical level;
   (e) eliciting from the user an indication of whether the named object or any of its children should be modified, and returning to step (b) responsive to a negative indication from the user;
   (f) presenting the user with the names of children of the named object, presenting the user with an opportunity to select the level of the presented children and to select a particular one of the presented children;
   (g) presenting the user with an opportunity to do any of:
      (g1) disassociating the named object from the next higher level;
      (g2) altering the name of the named object; or
      (g3) changing the order of the named object with respect to other objects associated with the same parent as the named object, and returning to step (b);
   (h) associating an object with the selected level, associating the name with the object, and associating with the object an identifier (ID) unique among the ID's of objects associated with the selected hierarchical level, and
   (i) returning to step (b).

* * * * *